(12) United States Patent
Park et al.

(10) Patent No.: US 11,955,866 B2
(45) Date of Patent: Apr. 9, 2024

(54) MOTOR

(71) Applicant: LG INNOTEK CO., LTD., Seoul (KR)

(72) Inventors: Kyung Sang Park, Seoul (KR); Ju Hwan Ku, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/893,695

(22) Filed: Aug. 23, 2022

(65) Prior Publication Data

US 2022/0399774 A1 Dec. 15, 2022

Related U.S. Application Data

(63) Continuation of application No. 16/765,011, filed as application No. PCT/KR2018/014350 on Nov. 21, 2018, now Pat. No. 11,451,105.

(30) Foreign Application Priority Data

Nov. 28, 2017 (KR) .......................... 10-2017-0160405
Sep. 28, 2018 (KR) .......................... 10-2018-0116465

(51) Int. Cl.
*H02K 5/10* (2006.01)
*H02K 3/52* (2006.01)
*H02K 5/173* (2006.01)

(52) U.S. Cl.
CPC ............... *H02K 5/10* (2013.01); *H02K 3/522* (2013.01); *H02K 5/1732* (2013.01); *H02K 2203/09* (2013.01)

(58) Field of Classification Search
CPC ....... H02K 5/10; H02K 3/522; H02K 2203/09
See application file for complete search history.

(56) References Cited

U.S. PATENT DOCUMENTS

| 3,707,037 | A  | 12/1972 | Gutris         |
|-----------|----|---------|----------------|
| 5,134,330 | A  | 7/1992  | Haas et al.    |
| 6,188,156 | B1 | 2/2001  | Maldeney       |
| 7,492,071 | B2 | 2/2009  | Chaohai et al. |
| 8,490,391 | B2 | 7/2013  | Franz et al.   |
| 9,831,738 | B2 | 11/2017 | Yamasaki et al.|
| 10,312,768| B2 | 6/2019  | Tomizawa et al.|

(Continued)

FOREIGN PATENT DOCUMENTS

| CN | 203482025 U | 3/2014 |
|----|-------------|--------|
| DE | 102 36 701 A1 | 2/2004 |

(Continued)

*Primary Examiner* — Robert W Horn
(74) *Attorney, Agent, or Firm* — Birch, Stewart, Kolasch & Birch, LLP

(57) ABSTRACT

An embodiment relates to a motor including a shaft; a rotor which is coupled to the shaft; a stator which is disposed outside the rotor; a housing which accommodates the rotor and the stator and has an opening formed at one side thereof; and a cover which covers the opening. The cover includes a cover plate portion; and a side wall which extends axially from the cover plate portion, and at least three grooves are formed in the side wall. Accordingly, the motor according to the embodiment can guarantee the sealing performance while preventing the bearing from being damaged when the rotor is assembled on the inside of the stator.

12 Claims, 26 Drawing Sheets

(56) References Cited

U.S. PATENT DOCUMENTS

| | | |
|---|---|---|
| 10,447,106 B2 | 10/2019 | Jang et al. |
| 10,494,014 B2 | 12/2019 | Yamashita et al. |
| 10,794,465 B2 | 10/2020 | Uematsu et al. |
| 10,826,355 B2 | 11/2020 | Kanazawa et al. |
| 10,971,966 B2 | 4/2021 | Kuehne et al. |
| 11,130,515 B2 | 9/2021 | Kim |
| 11,171,536 B2 | 11/2021 | Park et al. |
| 11,329,524 B2* | 5/2022 | Park .................. H02K 1/27 |
| 11,451,105 B2* | 9/2022 | Park .................. H02K 5/1732 |
| 2005/0116563 A1 | 6/2005 | Matsubara |
| 2015/0137637 A1 | 5/2015 | Jang et al. |
| 2019/0305651 A1 | 10/2019 | Mao et al. |
| 2020/0156696 A1 | 5/2020 | Hara et al. |
| 2020/0244140 A1 | 7/2020 | Kinjo et al. |
| 2020/0321823 A1 | 10/2020 | Park et al. |
| 2021/0062733 A1 | 3/2021 | Miwa |
| 2021/0273518 A1 | 9/2021 | Jo |
| 2022/0399774 A1* | 12/2022 | Park .................. H02K 5/10 |

FOREIGN PATENT DOCUMENTS

| | | |
|---|---|---|
| GB | 2061775 A | 5/1981 |
| JP | 56-30553 U | 3/1981 |
| JP | 8-22203 A | 1/1996 |
| JP | 2008-104321 A | 5/2008 |
| JP | 2008-187876 A | 8/2008 |
| JP | 2013-162730 A | 8/2013 |
| JP | 2015-163038 A | 9/2015 |
| JP | 2016-13000 A | 1/2016 |
| KR | 20-0205002 Y1 | 12/2000 |
| KR | 2002-0004622 A | 1/2002 |
| KR | 20-2009-0005076 A | 5/2009 |
| KR | 10-2015-0057566 A | 5/2015 |
| KR | 10-2016-0082053 A | 7/2016 |
| KR | 10-2017-0099206 A | 8/2017 |
| WO | WO 2017/084949 A1 | 5/2017 |

* cited by examiner

[FIG. 1]
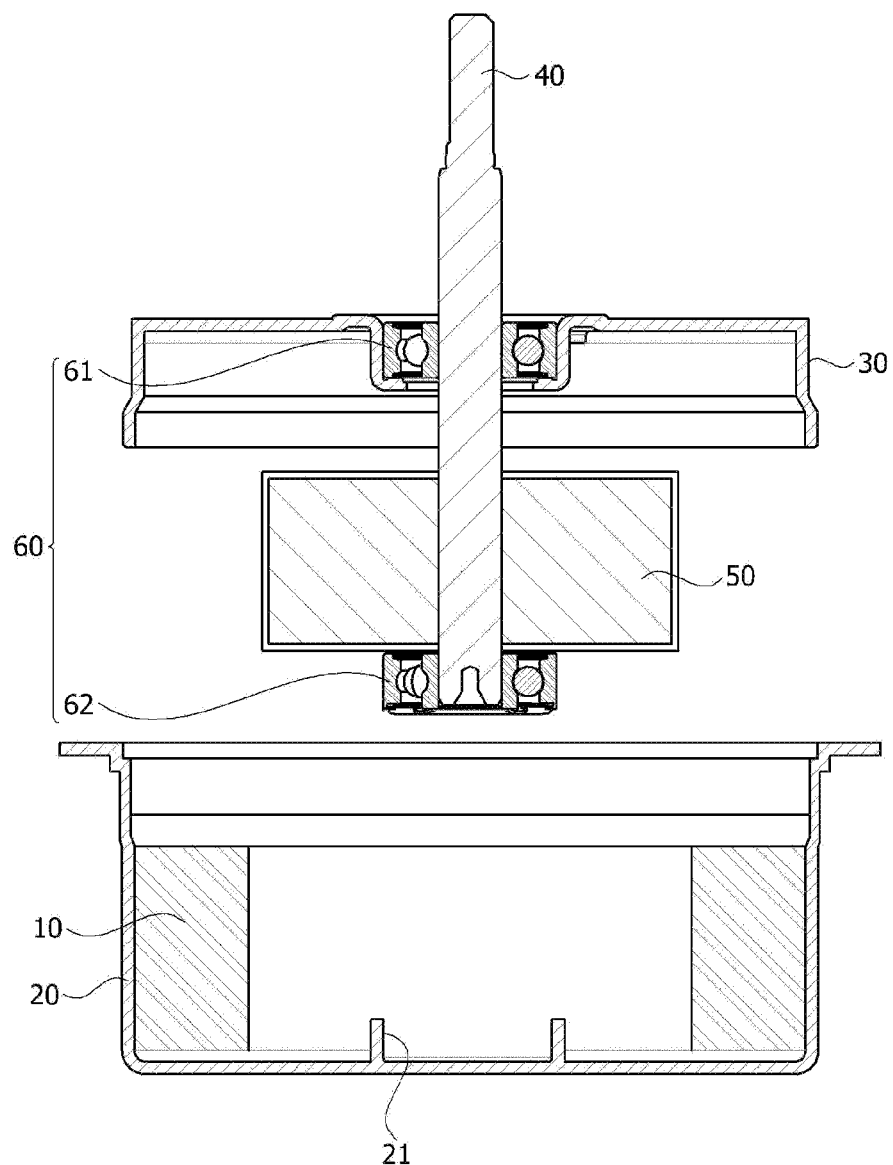

[FIG. 2]
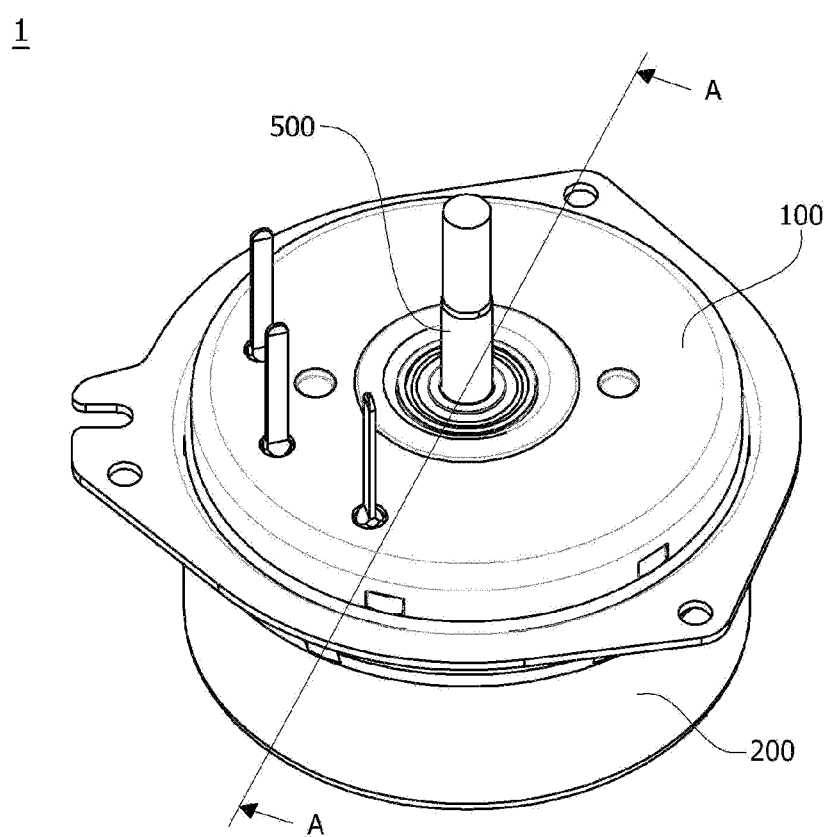

[FIG. 3]
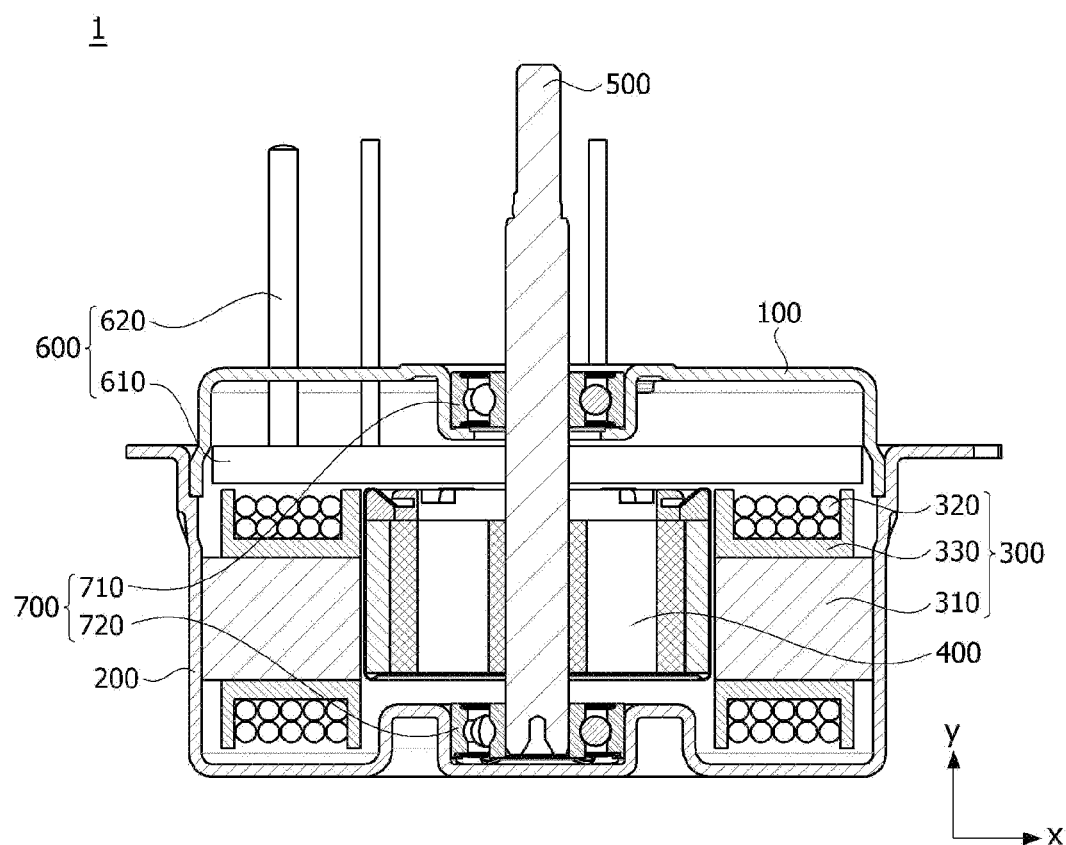

[FIG. 4]
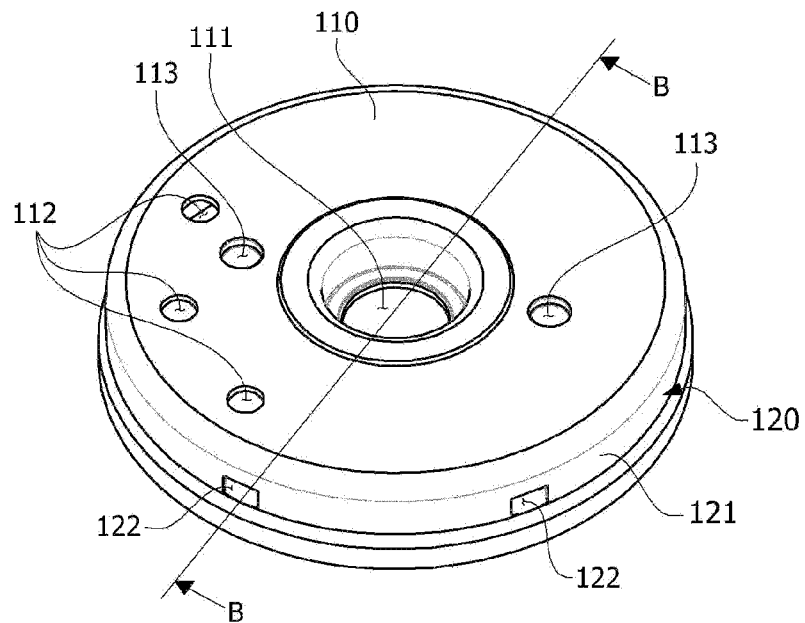
[FIG. 5]
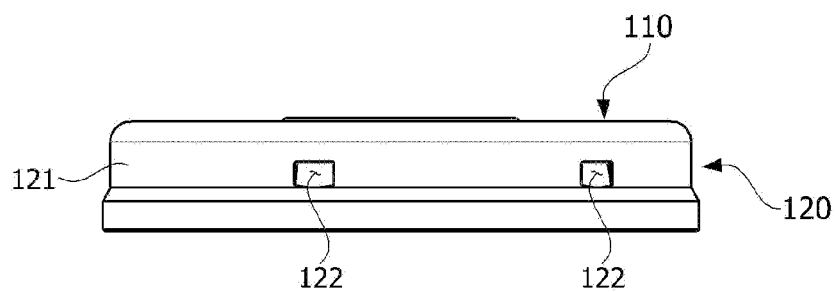

[FIG. 6]
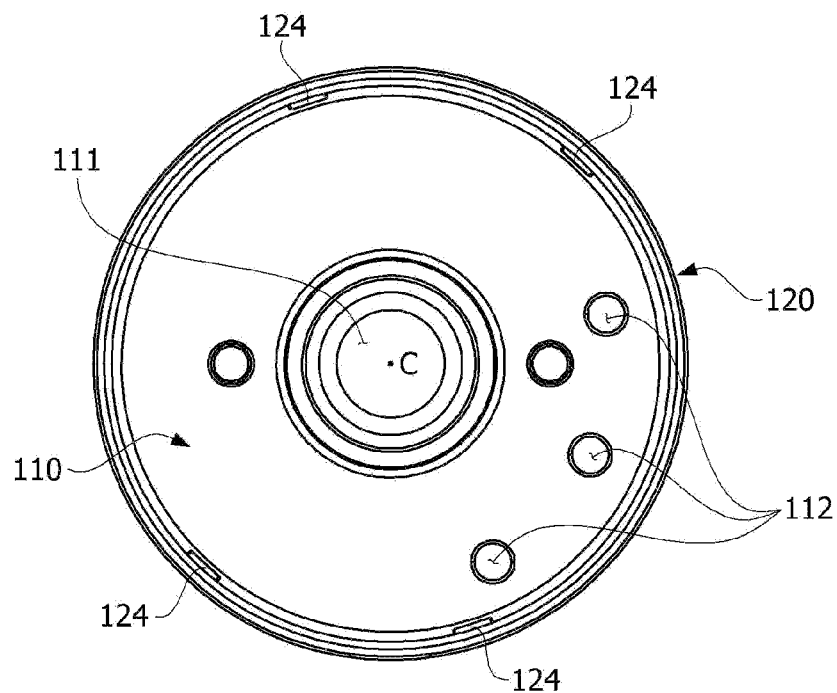
[FIG. 7]
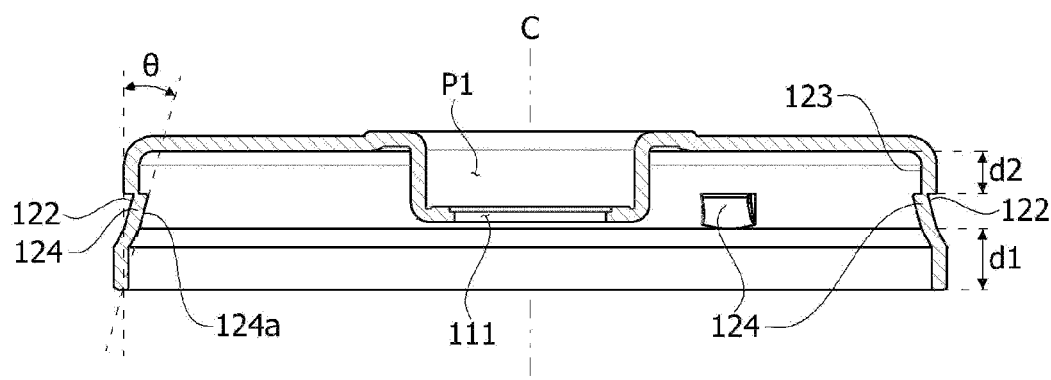

[FIG. 8]
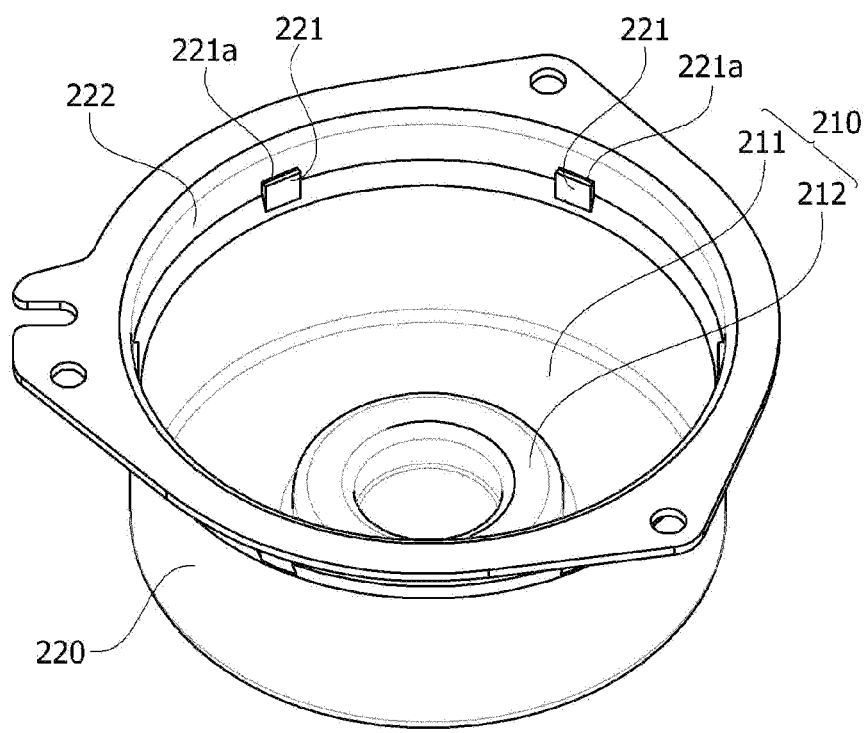

[FIG. 9]
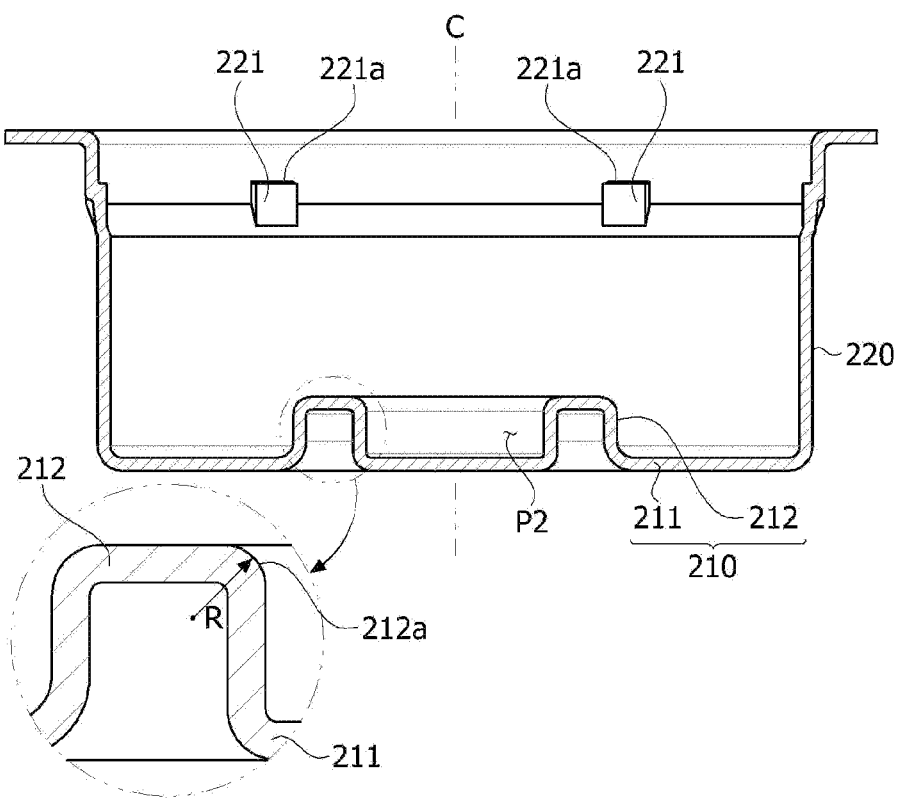

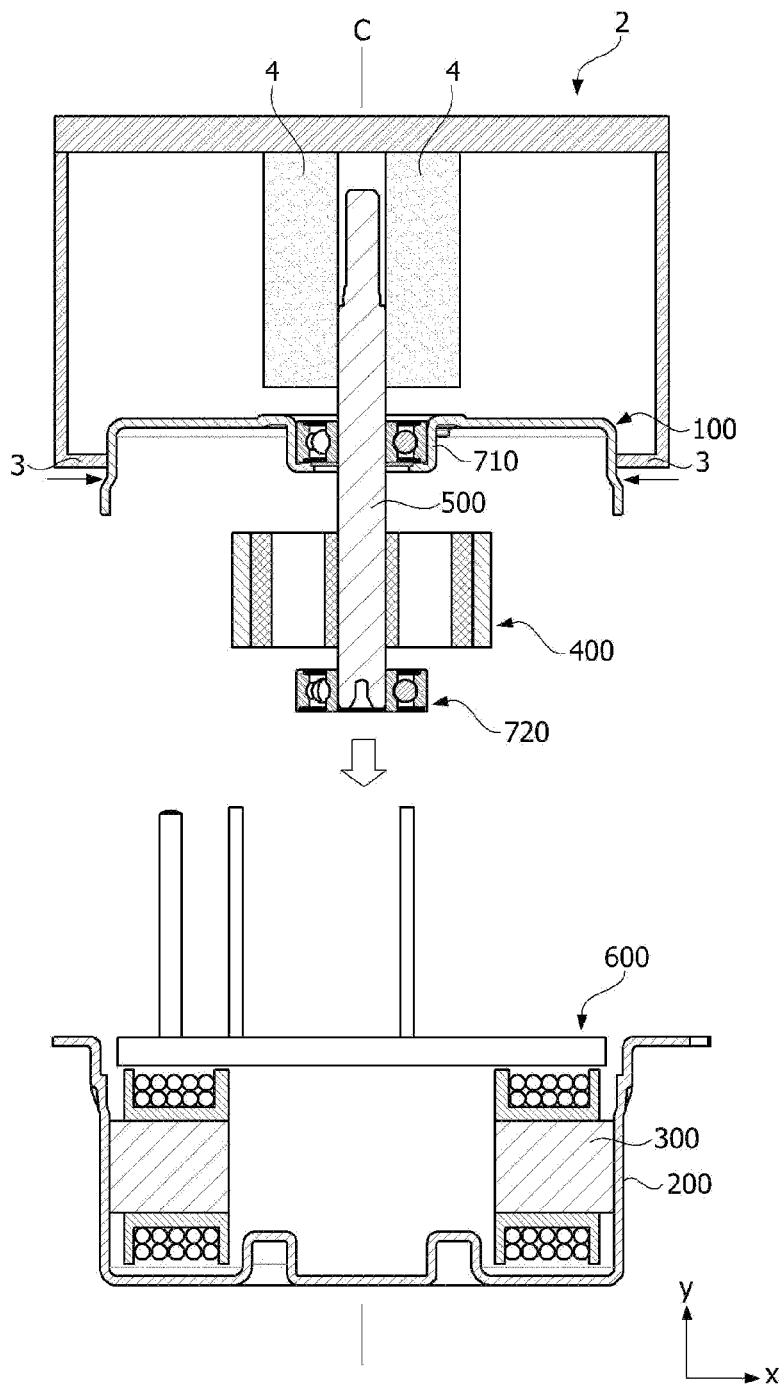
[FIG. 10]

[FIG. 11]
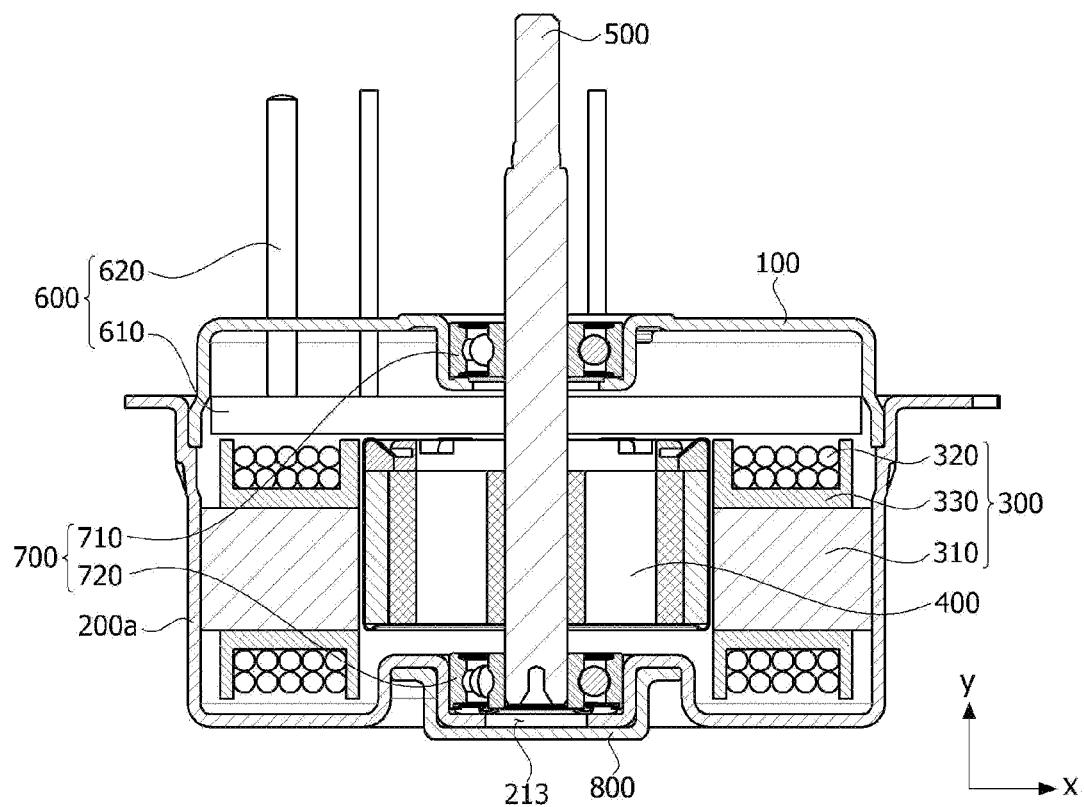

[FIG. 12]
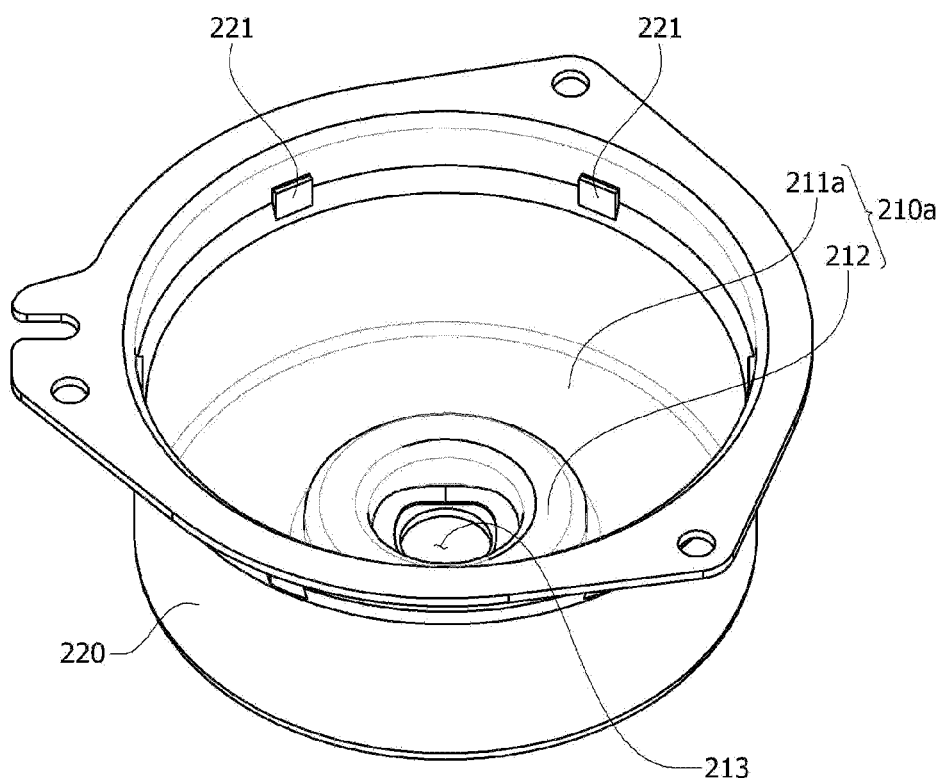

[FIG. 13]
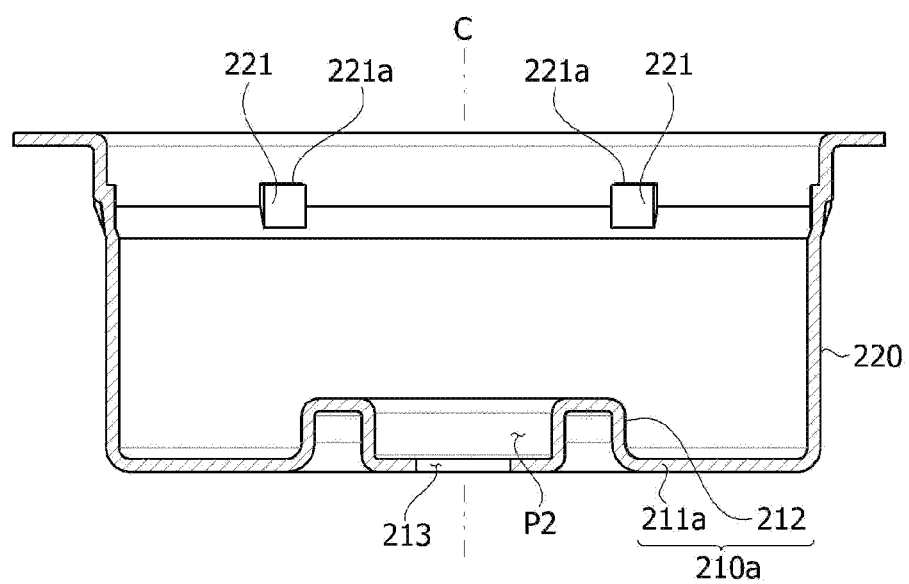

[FIG. 14]
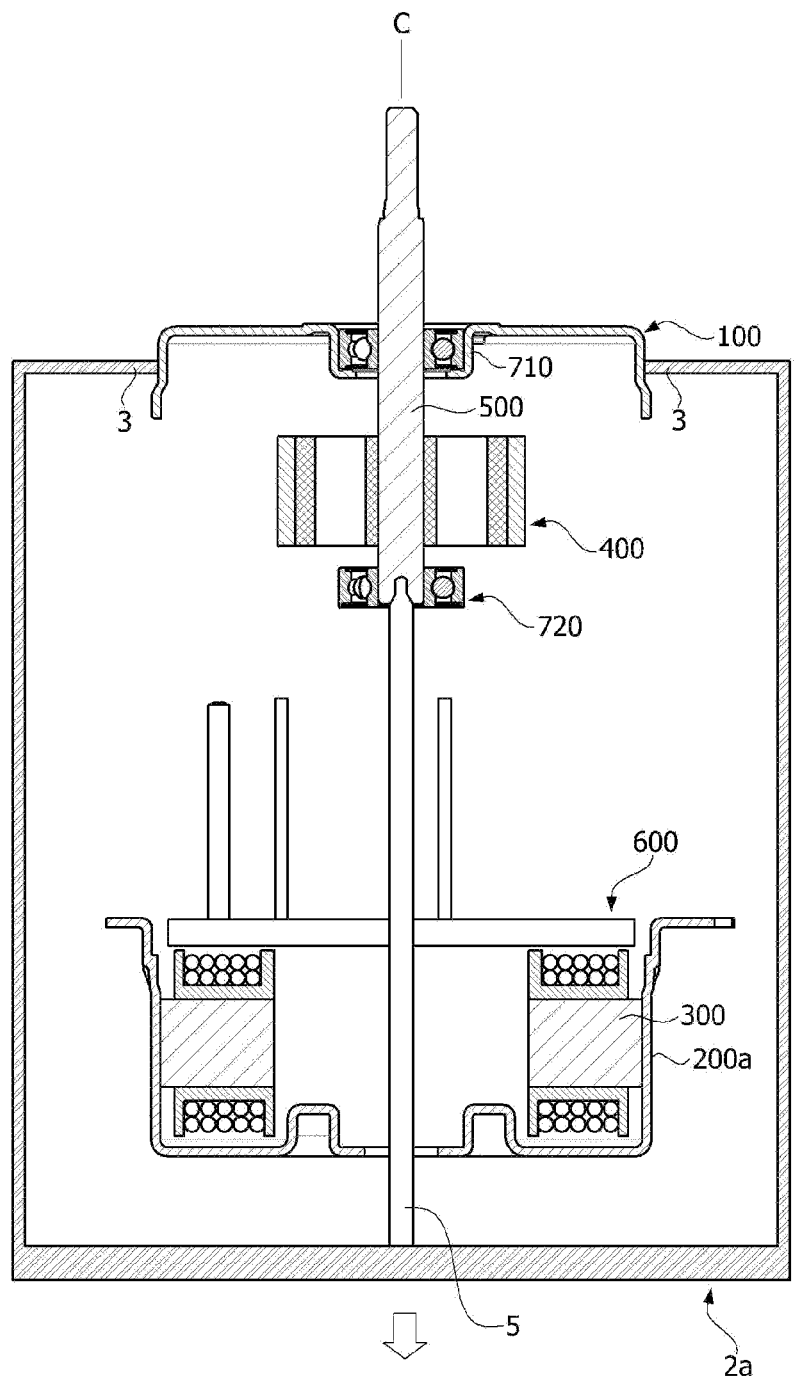

[FIG. 15]
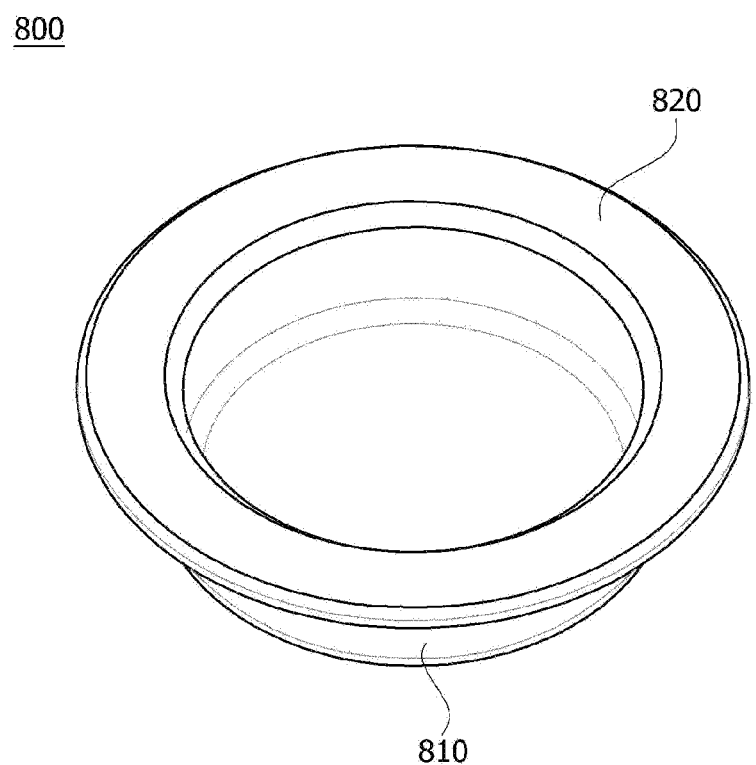

[FIG. 16]
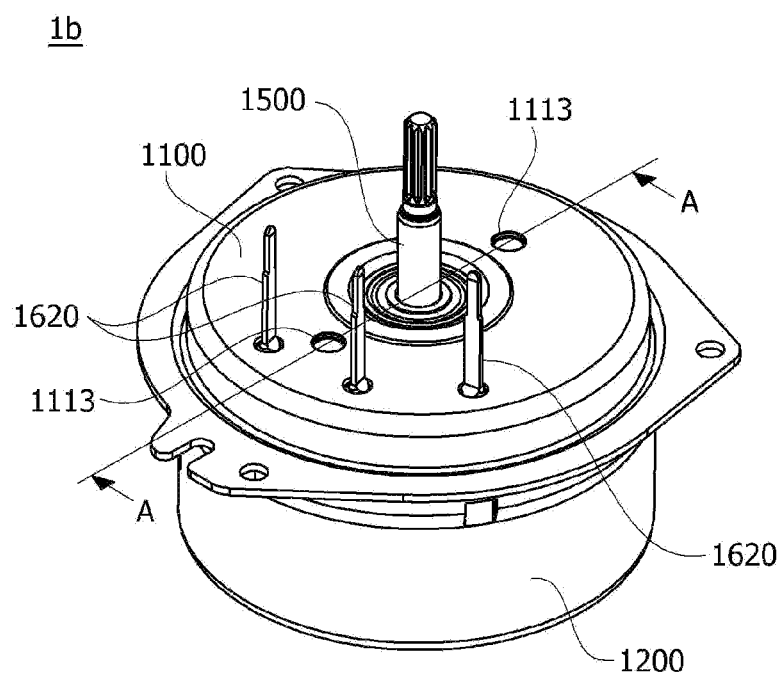

[FIG. 17]
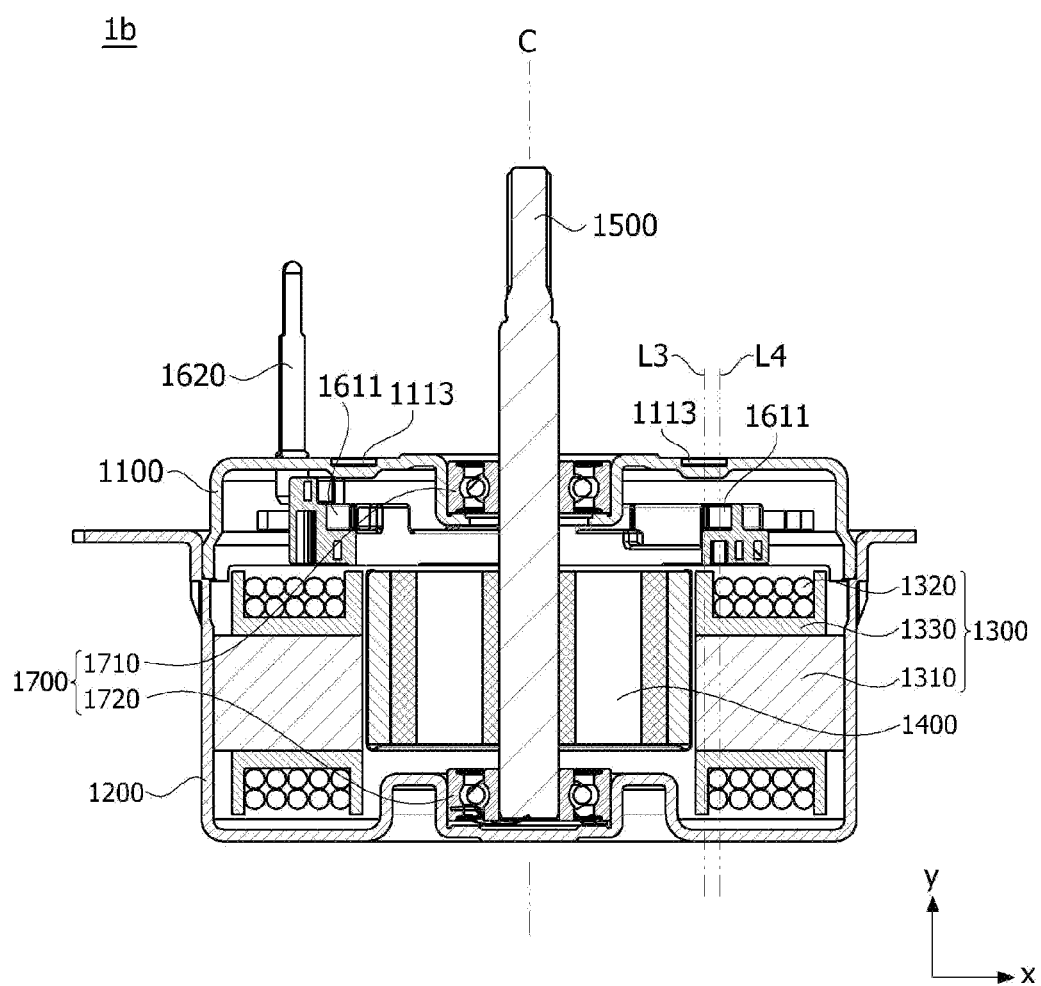

[FIG. 18]
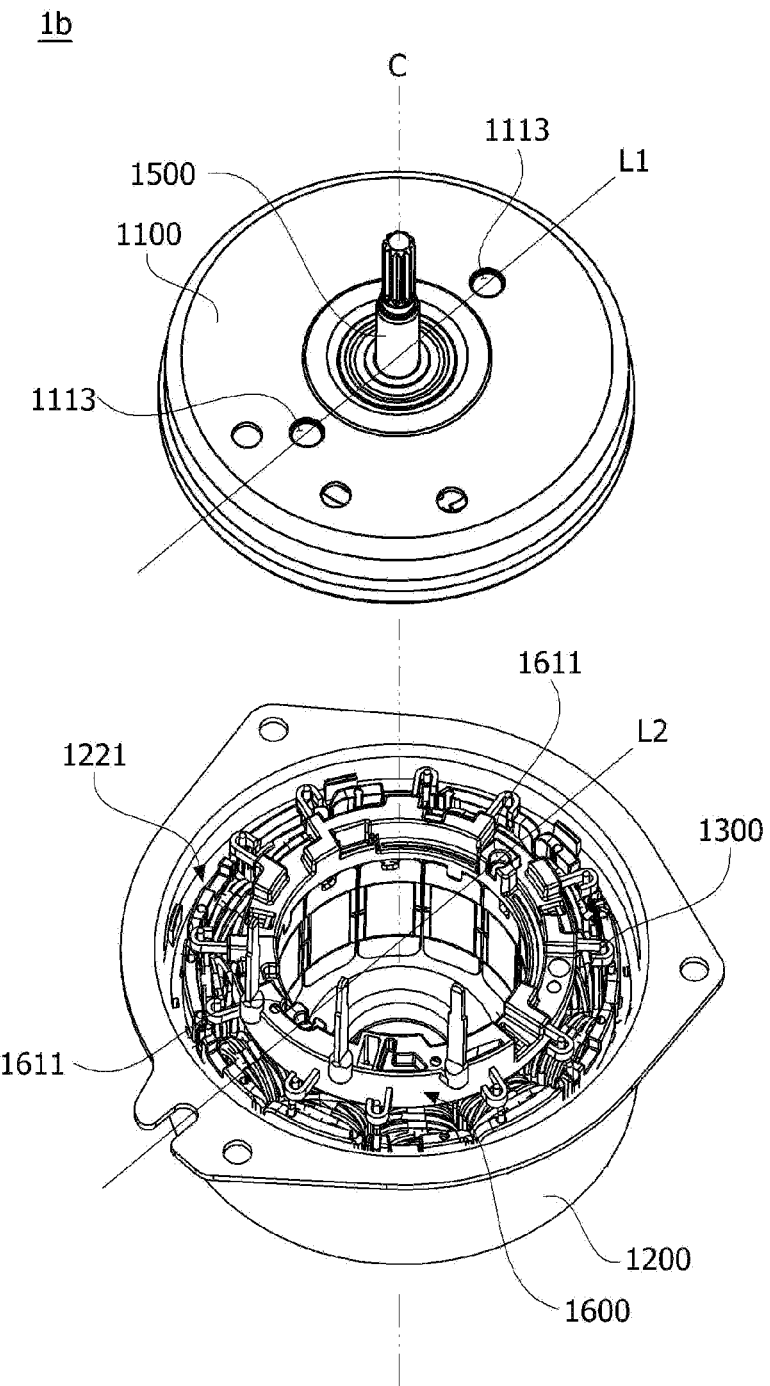

[FIG. 19]
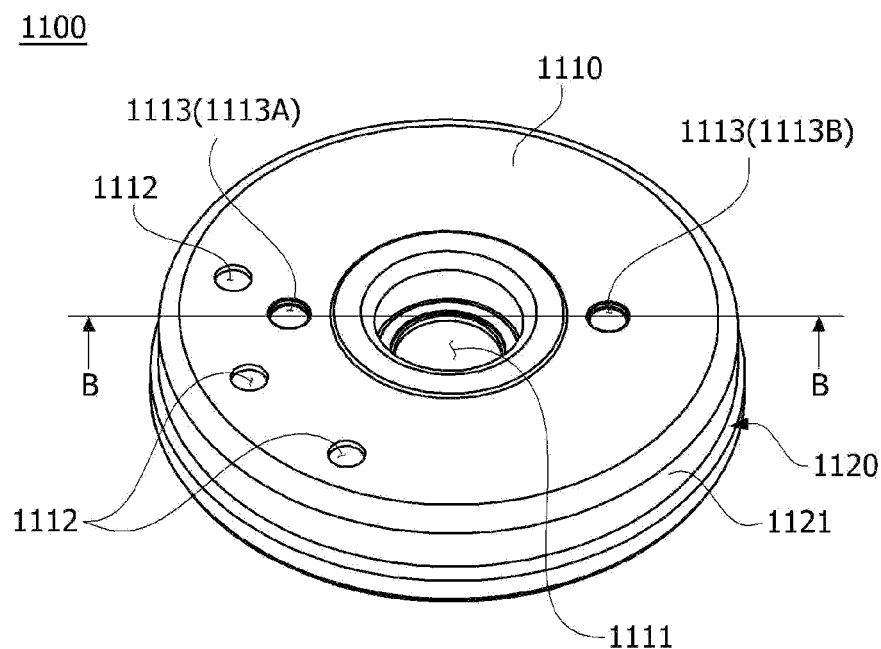
[FIG. 20]
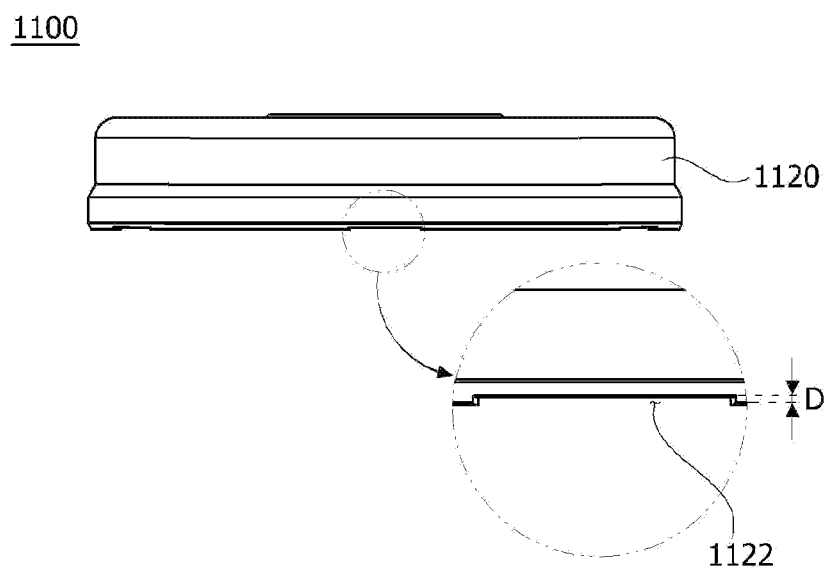

[FIG. 21]
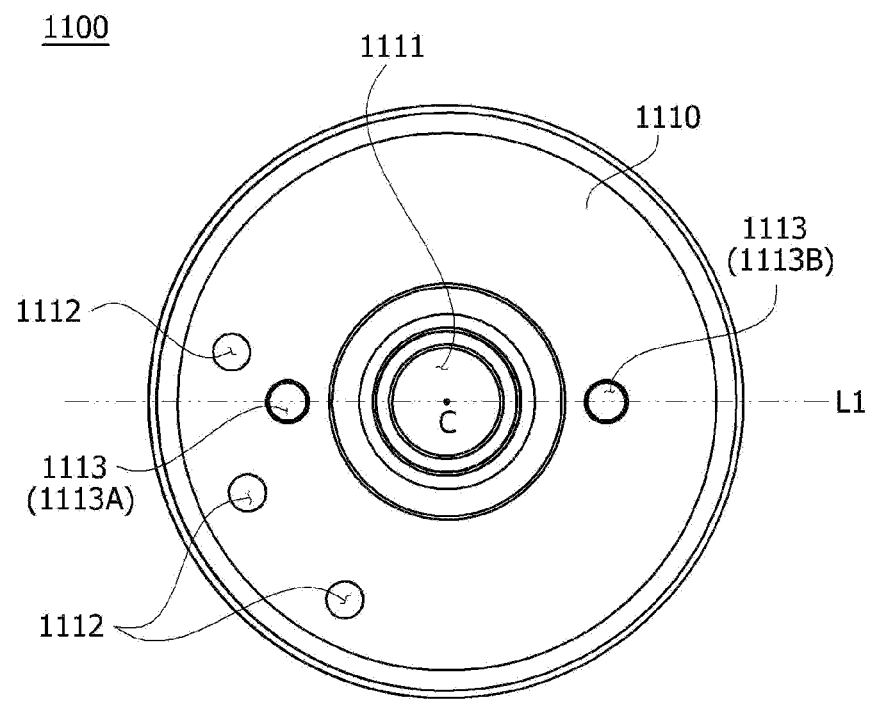
[FIG. 22]
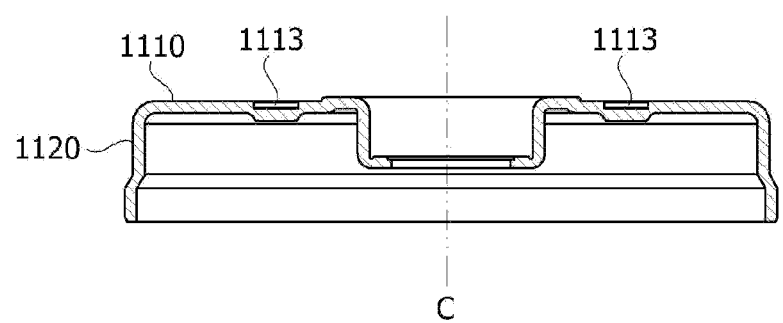

[FIG. 23]
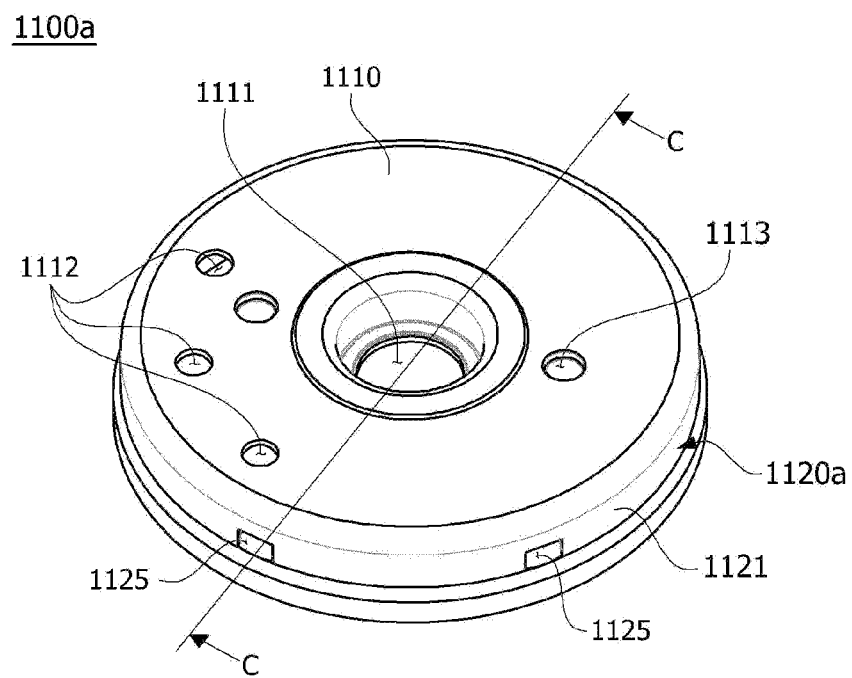

[FIG. 24]
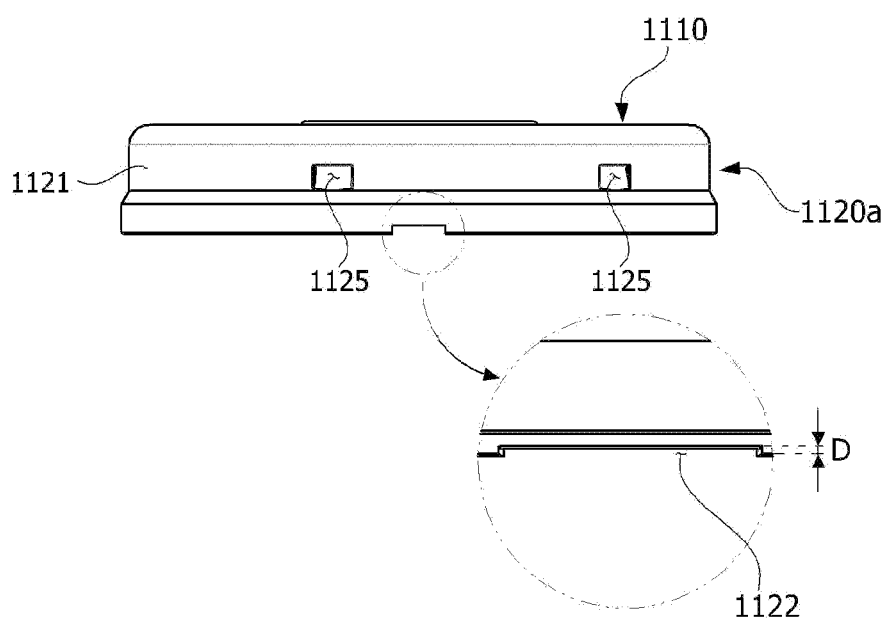

[FIG. 25]
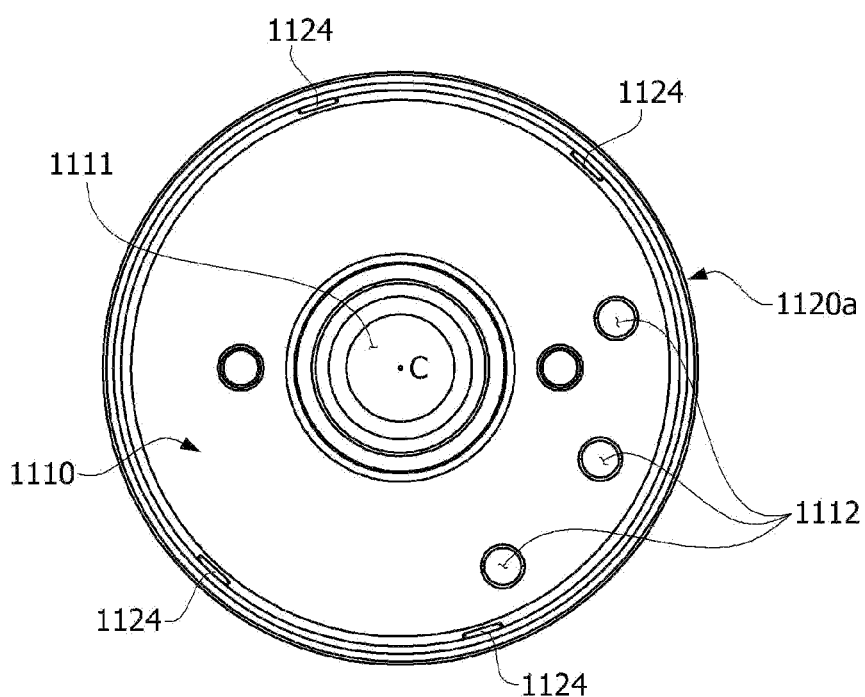
[FIG. 26]
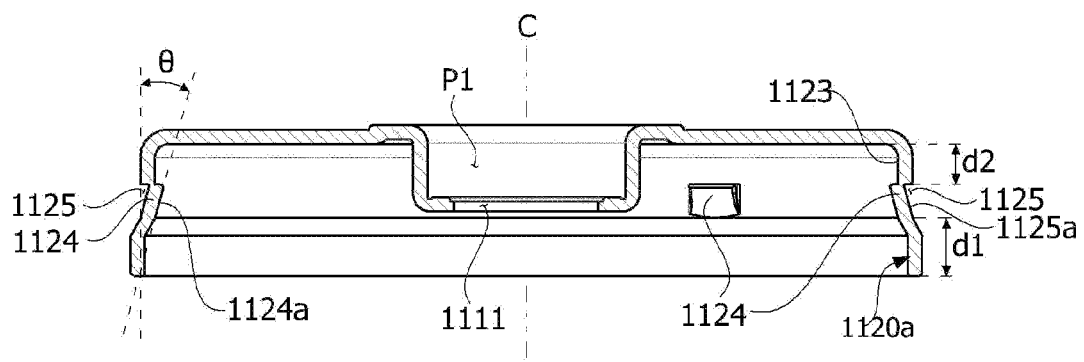

[FIG. 27]
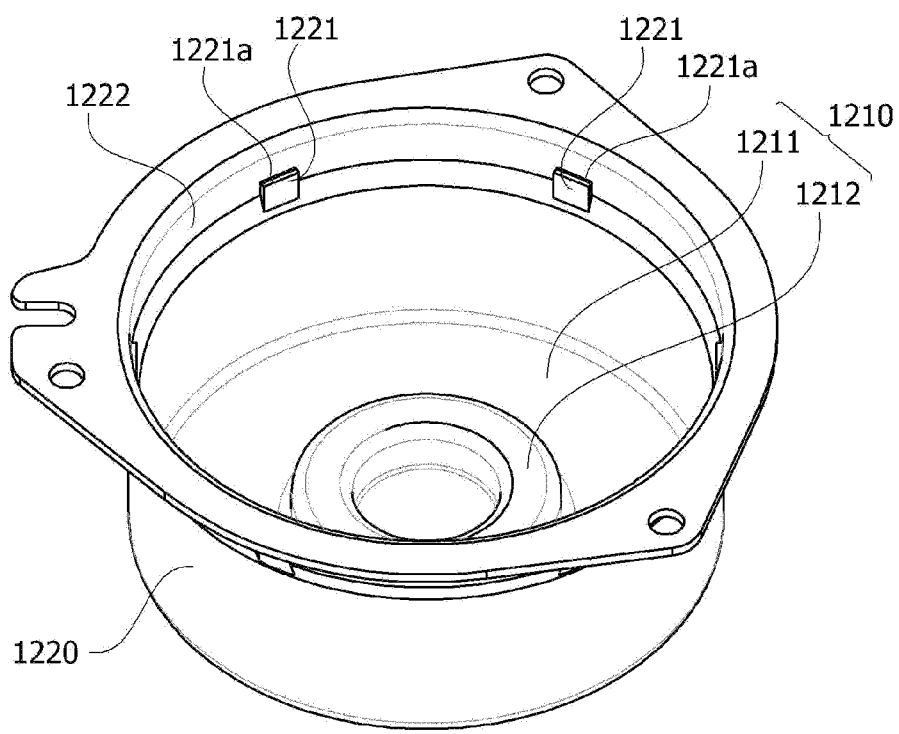

[FIG. 28]
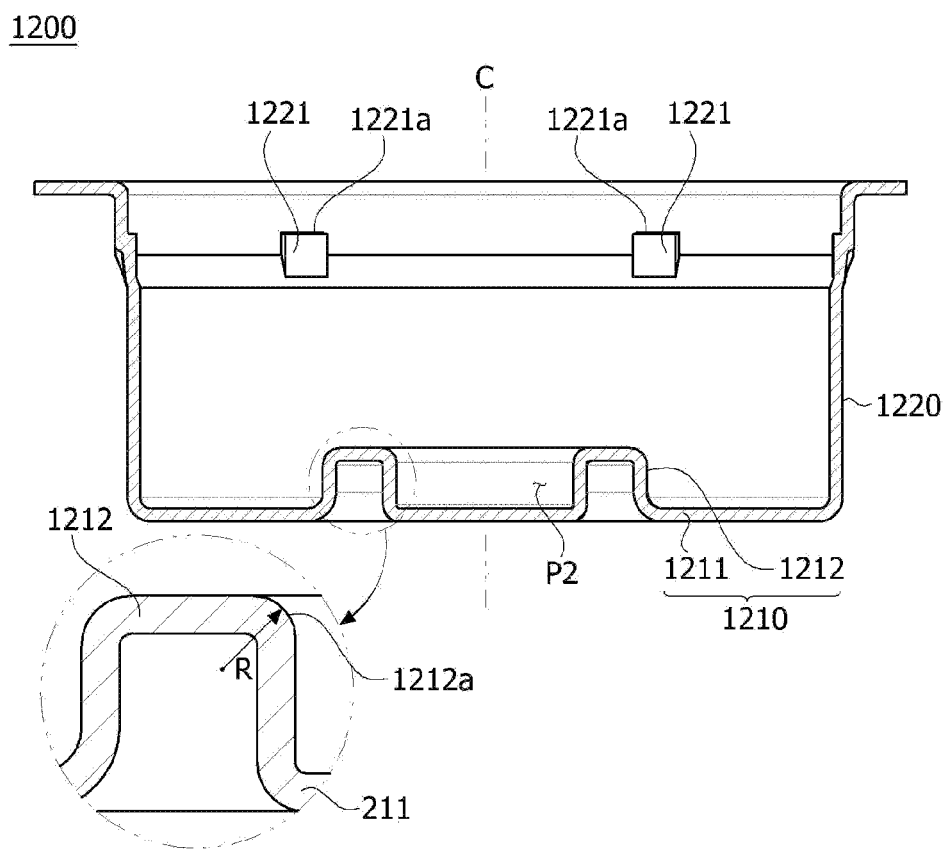

[FIG. 29]
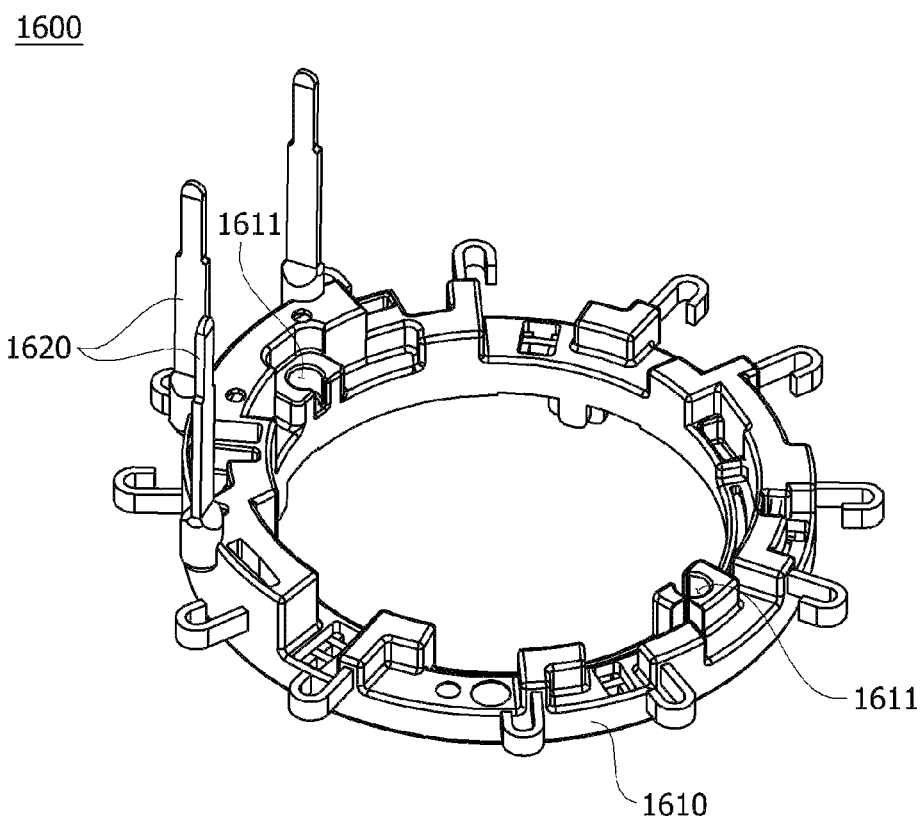

[FIG. 30]
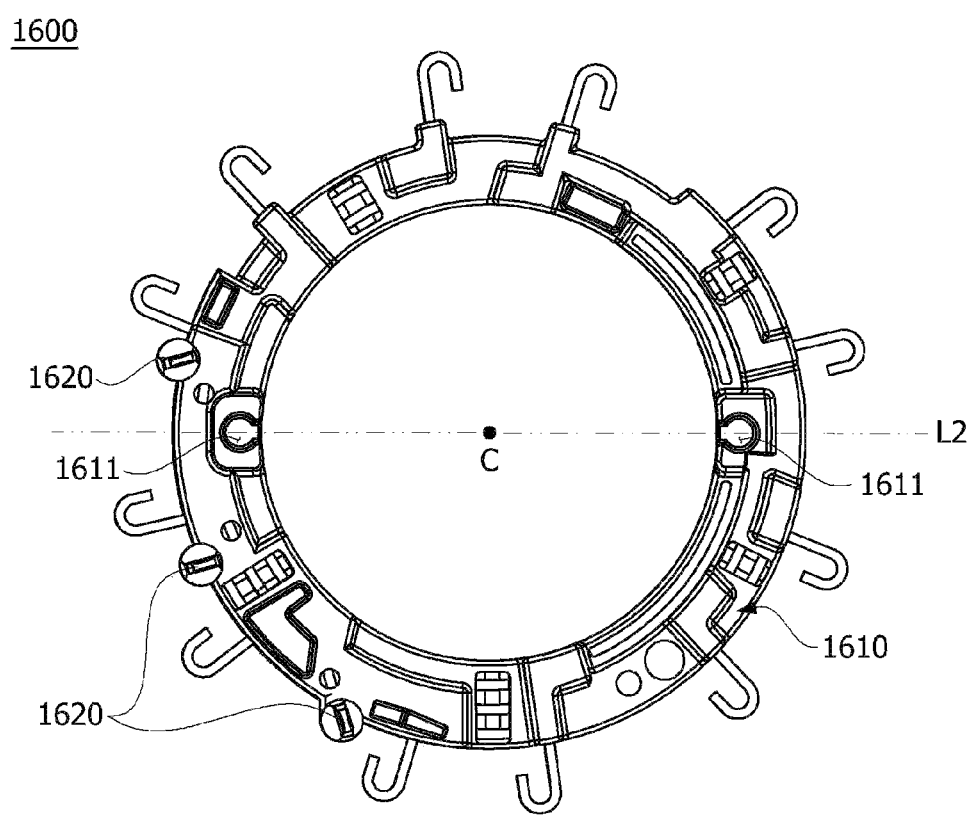

[FIG. 31]
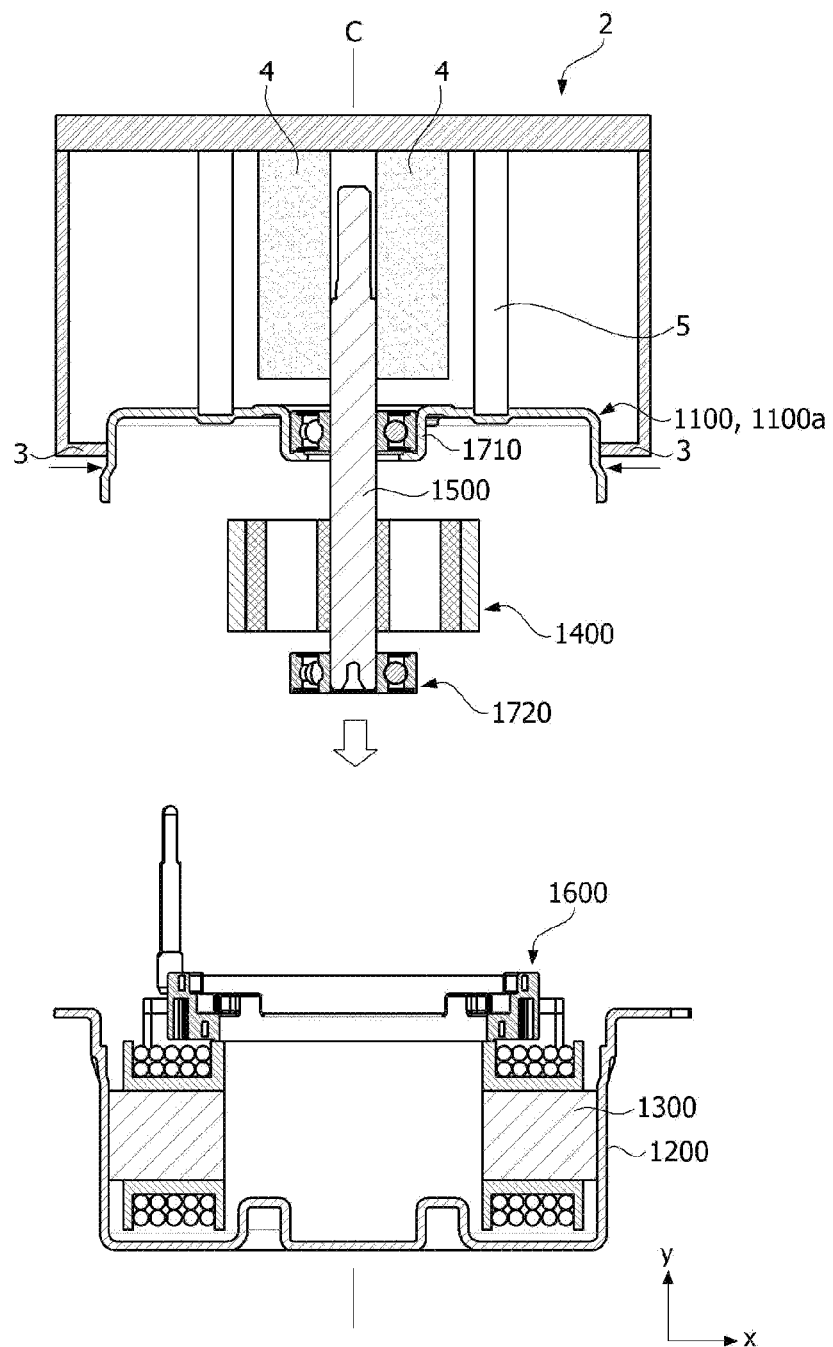

MOTOR

CROSS REFERENCE TO RELATED APPLICATIONS

This application is a Continuation Application of U.S. patent application Ser. No. 16/765,011 filed on May 18, 2020, which is the National Phase of PCT/KR2018/014350 filed on Nov. 21, 2018, which claims priority under 35 U.S.C. § 119(a) to Patent Application Nos. 10-2017-0160405 and 10-2018-0116465 filed in the Republic of Korea on Nov. 28, 2017 and Sep. 28, 2018 respectively, all of which are hereby expressly incorporated by reference into the present application.

TECHNICAL FIELD

Embodiments relate to a motor.

BACKGROUND ART

A motor is a device which converts electrical energy into rotational energy using a force that a conductor receives in a magnetic field. Recently, as a use of a motor has increased, a role of a motor has become more important. Particularly, as electric apparatuses in a vehicle rapidly increase, demands for motors applied to a steering system, a brake system, a design system, and the like are significantly increasing.

In general, a motor includes a shaft formed to be rotatable, a rotor coupled to the shaft, and a stator fixed inside a housing, in which the stator is installed along a circumference of the rotor with a gap therebetween. Also, a coil configured to form a rotating magnetic field is wound on the stator so as to cause an electrical interaction with the rotor and induce rotation of the rotor. As the rotor rotates, the shaft rotates and generates a driving force.

Also, a busbar electrically connected to the coil is disposed at a top end of the stator. The busbar generally includes a ring-shaped busbar housing and a busbar terminal coupled to the busbar housing and connected to the coil. Generally, in the busbar, the busbar terminal is formed by pressing a metal plate such as a copper plate.

Meanwhile, sealing performance of the motor depends on a cover and a housing which are coupled to form an exterior of the motor. Here, a central hole may be eliminated from the housing to satisfy an ingress protection (IP) code with respect to sealing.

However, a problem occurs in that a bearing is damaged during a process of assembling a rotor inside a stator disposed in a housing having no a central hole.

Hereinafter, the above-described damage of the bearing will be described with reference to FIG. 1.

FIG. 1 is a view illustrating assembling of a rotor-cover assembly.

Referring to FIG. 1, the rotor-cover assembly is assembled in a housing 20 in which a stator 10 is disposed.

The rotor-cover assembly may include a cover 30, a shaft 40 disposed in a center of the cover 30, a rotor 50 disposed outside the shaft 40, and a bearing 60 disposed on an outer circumferential surface of the shaft 40.

Here, the bearing 60 may include, depending on positions, an upper bearing 61 disposed on an upper part of the shaft 40 and a lower bearing 62 disposed on a lower part of the shaft 40. As shown in FIG. 1, the upper bearing 61 may be supported by the cover 30.

However, when the rotor-cover assembly is assembled in the housing 20 in which the stator 10 is disposed, a phenomenon occurs that the lower bearing 62 of the rotor-cover assembly collides with protrusions 21 of the housing 20 due to attraction between the magnetized rotor 50 and the stator 10. Accordingly, a problem is present in that the lower bearing 62 is damaged.

Also, in a structure of the motor, a length of the housing of the motor in an axial direction may be restricted or reduced by a customer's request. Accordingly, since a restriction on a design with respect to a size of the motor occurs, a motor having satisfied performance and a reduced size in the axial direction is necessary.

DISCLOSURE

Technical Problem

The present invention is directed to providing a motor allowing a bearing to be prevented from being damaged as well as allowing sealing performance to be secured when a rotor is assembled inside a stator.

The present invention is directed to providing a motor allowing a size to be reduced in an axial direction through designing of a structure of a cover as well as allowing a position to be secured for assembling the cover with a housing.

Aspects of the present invention are not limited to the above-stated aspect and other unstated aspects of the present invention will be understood by those skilled in the art from a following description.

Technical Solution

One aspect of the present invention provides a motor including a shaft, a rotor coupled to the shaft, a stator disposed outside the rotor, a busbar disposed above the stator, a housing in which the rotor and the stator are disposed and which includes an opening, and a cover coupled to the housing. Here, the cover includes a cover plate portion and a sidewall extending downward from the cover plate portion, and the sidewall includes an outer surface and a plurality of third grooves formed in the outer surface.

The sidewall may include an upper region adjacent to the cover plate portion, a lower region located below the upper region, and a stepped region formed between the upper region and the lower region. Here, the plurality of third grooves may be formed in the upper region.

The cover plate portion may include a plurality of first grooves, and the busbar may include fourth grooves perpendicularly overlapped with the first grooves of the cover plate portion. When the cover and the housing are coupled to each other, the first grooves of the cover plate portion and the fourth grooves of the busbar may be used to align positions of the cover plate portion and the busbar and to restrict movement of the busbar.

The plurality of third grooves may be disposed to be spaced at a certain first distance d1 from an end of the sidewall. The plurality of third grooves may be arranged to be spaced at a certain second distance (d2) from a corner at which the plate portion and the sidewall meet each other. Here, a size of the first distance (d1) may be greater than a size of the second distance (d2).

The plurality of third grooves may be arranged to be rotationally symmetrical on the basis of a center (C) of the cover.

The housing may include a housing plate portion, a sidewall portion having a cylindrical shape and protruding from the housing plate portion in an axial direction, and a plurality of second protrusions. Here, the second protrusions may be formed to protrude from an inner surface of the sidewall portion. Top surfaces of the second protrusions may come into contact with a bottom surface of the sidewall.

The sidewall may include a plurality of first protrusions. Here, the plurality of third grooves may be formed in one region of an outer circumferential surface of the sidewall to be recessed inward, and the first protrusions may be formed on an inner circumferential surface of the sidewall by applied pressure.

Another aspect of the present invention provides a motor including a housing, a cover coupled to the housing, a rotor disposed in the housing, a stator disposed between the rotor and the housing, and a busbar disposed between the stator and the cover. Here, the cover includes a cover plate portion including a first guide groove and a second guide groove and includes a sidewall extending from the cover plate portion and including a plurality of third grooves. Here, the first guide groove is disposed on a virtual straight line which connects the second guide groove to a center of the cover. The plurality of third grooves may be three of the third grooves, and an angle formed between virtual lines which each connect each of the plurality of third grooves to the center of the cover may be 120 degrees.

Still another aspect of the present invention provides a motor including a shaft, a rotor coupled to the shaft, a stator disposed outside the rotor, a housing which accommodates the rotor and the stator therein and includes an opening in one side, and a cover configured to cover the opening. Here, the cover includes a cover plate portion and a sidewall extending from the cover plate portion in an axial direction, and the sidewall includes at least three grooves formed therein. Here, the grooves may be arranged to be spaced at a certain first distance d1 from an end of the sidewall.

The grooves may be arranged to be spaced at a certain second distance d2 from a corner at which the cover plate and the sidewall meet each other. Here, the first distance d1 may be greater than the second distance d2.

The grooves may be formed by pressurizing one region of the sidewall in a radial direction, and first protrusions may be formed in an inner surface of the sidewall by the applied pressure.

An inner surface of the first protrusion may be formed to tilt at a certain angle $\theta$ on the basis of the axial direction.

The grooves may be arranged to be rotationally symmetrical on the basis of a center (C) of the cover.

The housing may include a housing plate portion and a sidewall portion protruding from the housing plate portion in the axial direction, and second protrusions protruding inward may be formed on the sidewall portion.

The housing plate portion may include a plate-shaped body and a ring-shaped uplifted portion formed by a part protruding from the body. Here, a pocket portion may be formed inside the uplift portion due to the uplift portion, and the pocket portion may accommodate a lower bearing disposed on an outer circumferential surface of the shaft.

The uplift portion may include a corner formed as a curved surface having a certain curvature.

A hole may be formed in a center of the body, and the motor may further include a cap disposed to cover the hole.

Top surfaces of the second protrusions may come into contact with a bottom surface of the sidewall.

Yet another aspect of the present invention provides a motor including a shaft, a rotor coupled to the shaft, a stator disposed outside the rotor, a busbar disposed above the stator, a housing which accommodates the rotor, the stator, and the busbar, and a cover disposed above the housing. Here, the cover includes a cover plate portion and a sidewall extending from the cover plate portion in an axial direction, and the busbar includes a busbar body and a plurality of terminals arranged on the busbar body. Also, a virtual first line L1, which connects centers of at least two first grooves formed in the cover plate portion, is disposed to be parallel to a virtual second line L2 which connects centers of at least two fourth grooves formed in the busbar body. Here, the first grooves may be arranged further inside the fourth grooves in a radial direction.

The cover may include a second groove formed at a lower end of the sidewall to be recessed with a certain depth D. The housing may include second protrusions protruding inward. When the housing and the cover are coupled, the second protrusions may be arranged in the second groove.

The cover may further include third grooves concavely formed in an outer circumferential surface of the sidewall.

The third grooves may be formed by pressurizing one region of the sidewall in the radial direction. Here, due to the third grooves being formed by the applied pressure, first protrusions may be formed on an inner circumferential surface of the sidewall to protrude therefrom. An inner surface of the first protrusion may be formed to tilt at a certain angle $\theta$ on the basis of the axial direction.

The housing may include a housing plate portion and a sidewall portion protruding from the housing plate portion in the axial direction, and second protrusions protruding inward may be formed on the sidewall portion.

The first line L1 may pass through a center of the cover. The second line L2 may pass through a center of the busbar.

The cover plate portion may include a plurality of second holes, and the terminals of the busbar may pass through and be disposed in the second holes.

Advantageous Effects

A motor according to embodiments which includes the above components can prevent a bearing from being damaged as well as secure sealing performance when a rotor is assembled inside a stator.

To this end, in the motor, the rotor can be installed inside a housing without a damage of the bearing using a groove formed on an outer circumferential surface of a cover.

Here, sealing performance of the motor can be improved by eliminating a hole at a bottom surface of the housing.

Also, since it is unnecessary to apply an additional sealing member due to the hole being eliminated, the motor can be efficiently manufactured during mass production. That is, although a curing time of the sealing member is necessary when the sealing member is applied, since it is possible to omit a procedure of applying the sealing member, motor productivity can be increased.

In the motor according to embodiments which includes the above components, an assembling position of the cover can be determined using positions of the groove formed in the cover and a groove formed in a busbar.

Also, when the cover is coupled to the housing, a size of the motor in an axial direction can be reduced using a second groove of the cover.

Also, in the motor, to allow a fixing device such as a jig to hold the cover, the rotor can be installed inside the housing without damage to a lower bearing using a third groove formed in the outer circumferential surface of the cover. Here, sealing performance of the motor can be improved by eliminating a conventional hole formed in a bottom surface of the housing.

Also, since it is unnecessary to apply an additional sealing member due to the hole being eliminated from the housing, motor productivity can be increased. That is, although a curing time of the sealing member is necessary when the sealing member is applied, since it is possible to omit, from the motor, a procedure of applying the sealing member, motor productivity can be increased.

A variety of advantageous effects of the embodiments are not limited thereto and will be easily understood throughout the detailed description of the embodiments.

DESCRIPTION OF DRAWINGS

FIG. 1 is a view illustrating assembling of a rotor-cover assembly.

FIG. 2 is a perspective view illustrating a motor according to an embodiment;

FIG. 3 is a cross-sectional view of a motor according to a first embodiment taken along line A-A of FIG. 2;

FIG. 4 is a perspective view illustrating a cover of the motor according to the first embodiment;

FIG. 5 is a side view illustrating the cover of the motor according to the first embodiment;

FIG. 6 is a bottom view illustrating the cover of the motor according to the first embodiment;

FIG. 7 is a cross-sectional view taken along line B-B of FIG. 4;

FIG. 8 is a perspective view illustrating a housing of the motor according to the first embodiment;

FIG. 9 is a cross-sectional view illustrating the housing of the motor according to the first embodiment;

FIG. 10 is a view illustrating a process of assembling a rotor-cover assembly of the motor according to the first embodiment;

FIG. 11 is a cross-sectional view of a motor according to a second embodiment;

FIG. 12 is a perspective view illustrating a housing of the motor according to the second embodiment;

FIG. 13 is a cross-sectional view illustrating the housing of the motor according to the second embodiment;

FIG. 14 is a view illustrating a process of assembling a rotor-cover assembly of the motor according to the second embodiment;

FIG. 15 is a perspective view illustrating a cap of the motor according to the second embodiment;

FIG. 16 is a perspective view illustrating a motor according to a third embodiment;

FIG. 17 is a cross-sectional view illustrating the motor according to the third embodiment;

FIG. 18 is an exploded-perspective view illustrating the motor according to the third embodiment;

FIG. 19 is a perspective view illustrating a cover of the motor according to the third embodiment;

FIG. 20 is a side view illustrating the cover of the motor according to the third embodiment;

FIG. 21 is a plan view illustrating the cover of the motor according to the third embodiment;

FIG. 22 is a cross-sectional view illustrating the cover of the motor according to the third embodiment;

FIG. 23 is a perspective view illustrating another example of the cover disposed on the motor according to the third embodiment;

FIG. 24 is a side view illustrating another example of the cover disposed on the motor according to the third embodiment;

FIG. 25 is a bottom view illustrating another example of the cover disposed on the motor according to the third embodiment;

FIG. 26 is a cross-sectional view illustrating another example of the cover disposed on the motor according to the third embodiment;

FIG. 27 is a perspective view illustrating a housing of the motor according to the third embodiment;

FIG. 28 is a cross-sectional view illustrating the housing of the motor according to the third embodiment;

FIG. 29 is a perspective view illustrating a busbar of the motor according to the third embodiment;

FIG. 30 is a plan view illustrating the busbar of the motor according to the third embodiment; and FIG. 31 is a view illustrating a process of assembling a rotor-cover assembly of the motor according to the third embodiment.

MODES OF THE INVENTION

Hereinafter, exemplary embodiments of the present invention will be described in detail with reference to the drawings.

However, the technical concept of the present invention is not limited to some embodiments disclosed below but can be implemented in a variety of different forms. One or more components of the embodiments may be selectively combined or substituted with one another without departing from the scope of the technical concept of the present invention.

Also, unless defined otherwise, the terms (including technical and scientific terms) used herein may be used as meanings capable of being commonly understood by one of ordinary skill in the art. Also, terms defined in generally used dictionaries may be construed in consideration of the contextual meanings of the related art.

Also, the terms used herein are intended to describe the embodiments but not intended to restrict the present invention.

Throughout the specification, unless particularly stated otherwise, singular forms include plural forms. When the present invention is stated to include at least one (or one or more) of A, B, and C, one or more of all combinations of A, B, and C may be included.

Also, in describing components of the embodiments of the present invention, the terms such as first, second, A, B, (a), (b), and the like may be used.

These terms are merely for distinguishing one element from another, and the essential, order, sequence, and the like of corresponding elements are not limited by the terms.

Also, when it is stated that one element is "connected," or "coupled" to another, the element may not only be directly connected or coupled to the other element but may also be connected or coupled to the other element with another intervening element.

Also, when it is stated that an element is formed or disposed "above (on) or below (under)" another element, not only the two elements may come into direct contact with each other but also still another element may be formed or disposed between the two elements. Also, being "above (on) or below (under)" may include not only being in an upward direction but also being in a downward direction on the basis of one element.

Hereinafter, the embodiments will be described below in detail with reference to that attached drawings. However, equal or corresponding components will be referred to as the same reference numerals regardless of drawing signs, and a repetitive description thereof will be omitted.

Embodiment 1

FIG. 2 is a perspective view illustrating a motor according to an embodiment, and FIG. 3 is a cross-sectional view of a motor according to a first embodiment taken along line A-A of FIG. 2. Here, an x direction shown in FIG. 3 means a radial direction, and a y direction means an axial direction.

Referring to FIGS. 1 and 2, a motor 1 according to the first embodiment may include a cover 100, a housing 200 disposed below the cover 100, a stator 300 disposed inside the housing 200, a rotor 400 disposed inside the stator 300, a shaft 500 rotating with the rotor 400, a busbar 600 disposed above the stator 300, and a bearing 700 disposed on an outer circumferential surface of the shaft 500. Here, the bearing 700 may include, depending on positions, an upper bearing 710 disposed on an upper part of the shaft 500 and a lower bearing 720 disposed on a lower part thereof.

The cover 100 and the housing 200 may form an exterior of the motor 1. Here, the housing 200 may be formed to have a cylindrical shape with an opening on top.

Accordingly, an accommodation space may be formed therein by coupling between the cover 100 and the housing 200. Also, in the accommodation space, as shown in FIG. 3, the stator 300, the rotor 400, the shaft 500, and the like may be arranged.

The cover 100 may be disposed on an opening surface of the housing 200, that is, above the housing 200 to cover the opening of the housing 200.

FIG. 4 is a perspective view illustrating the cover of the motor according to the first embodiment, FIG. 5 is a side view illustrating the cover of the motor according to the first embodiment, FIG. 6 is a bottom view illustrating the cover of the motor according to the first embodiment, and FIG. 7 is a cross-sectional view taken along line B-B of FIG. 4.

Referring to FIGS. 4 and 7, the cover 100 may include a plate-shaped cover plate portion 110 and a sidewall 120 extending from the cover plate portion 110 in the axial direction. Here, the cover plate portion 110 and the sidewall 120 may be integrally formed.

The cover plate portion 110 may be formed to have a plate shape.

In the cover plate portion 110, a first hole 111 formed in a center and a plurality of second holes 112 may be formed. Also, the cover plate portion 110 may include a first pocket portion P1 formed such that a center is recessed downward. Here, the first pocket portion P1 may be referred to as a cover pocket portion.

The shaft 500 may be disposed inside the first hole 111. Here, the upper bearing 710 may be disposed on the upper part of the shaft 500 and be disposed in the first pocket portion P1. Accordingly, the cover plate portion 110 may support the upper bearing 710.

A terminal of the busbar 600 may be disposed inside the second hole 112. As shown in FIG. 4, three second holes 112 may be formed in the cover plate portion 110.

Meanwhile, the cover plate portion 110 may further include first grooves 113 collinearly arranged in the radial direction. The first grooves 113 are arranged to face each other on the basis of a center C and may be used as elements for determining a position of the cover plate portion 110.

The sidewall 120 may protrude downward from a bottom surface of the cover plate portion 110. For example, the sidewall 120 may protrude downward from an edge of the cover plate portion 110. Here, the sidewall 120 may be formed to have a cylindrical shape.

To allow a fixing device such as a jig to hold the cover 100, grooves 122 may be formed in the sidewall 120. Accordingly, an end of the jig may be disposed in the grooves 122 such that the jig may pressurize the cover 100.

At least three grooves 122 may be concavely formed in an outer circumferential surface 121 of the sidewall 120. At least three grooves 122 may be arranged at preset intervals to prevent horizontal movement of the cover 100, but the number of the grooves 122 is not limited thereto.

Referring to FIG. 6, four of the grooves 122 may be arranged. Here, the grooves 122 may be arranged to be rotationally symmetrical on the basis of the center C of the cover 100.

That is, since the grooves 122 are arranged on the same level, they may be arranged to be rotationally symmetrical on the basis of the center C of the cover 100. Accordingly, the fixing device prevents horizontal movement of the cover 100 by applying a certain level of force to the outer circumferential surface 121 of the cover 100 through the grooves 122.

Referring to FIG. 7, the grooves 122 may be arranged to be spaced at a certain first distance d1 from an end of the sidewall 120. Also, the grooves 122 may be arranged to be spaced at a certain second distance d2 from a corner where the cover plate portion 110 meets the sidewall 120.

Here, the first distance d1 is greater than the second distance d2. Accordingly, the cover 100 may secure stiffness corresponding to a force applied to the grooves 122. For example, most of the force applied to the cover 100 by the fixing device is supported by the cover plate portion 110.

The groove 122 may be formed by pressurizing one region of the sidewall 120 in the radial direction. Here, first protrusions 124 may be formed on an inner circumferential surface 123 of the sidewall 120 due to the applied pressure.

The first protrusions 124 may be formed to protrude inward from the inner circumferential surface 123 of the sidewall 120.

As shown in FIG. 7, an inner surface 124a of the first protrusion 124 may be formed to tilt at a certain angle θ on the basis of the axial direction. Here, the inner surface 124a of the first protrusion 124 may be formed to tilt upward. Accordingly, one surface of the groove 122 may also be formed to tilt upward. Accordingly, the force applied to the grooves 122 by the fixing device may be further guided toward the cover plate portion 110.

The housing 200 is disposed below the cover 100.

Here, the housing 200 may be formed to have a cylindrical shape. Also, the housing 200 may accommodate the stator 300, the rotor 400, and the like therein. Here, a shape or a material of the housing 200 may be variously modified. For example, the housing 200 may be formed of a metal material capable of withstanding high temperatures well.

FIG. 8 is a perspective view illustrating the housing of the motor according to the first embodiment, and FIG. 9 is a cross-sectional view illustrating the housing of the motor according to the first embodiment.

Referring to FIGS. 8 and 9, the housing 200 may include a housing plate portion 210 and a sidewall portion 220 extending upward from the housing plate portion 210.

The housing plate portion 210 may include a plate-shaped body 211 and an uplift portion 212 formed by a part protruding from the body 211.

When viewed from above, the uplift portion 212 may have a ring shape. Here, the uplift portion 212 may be formed by pressurizing a bottom of the body 211. As shown in FIG. 9, the housing plate portion 210 may be formed to have an uneven shape due to the uplift portion 212.

Since the uplift portion 212 is disposed to be spaced from a center C of the body 211 in the radial direction, a second pocket portion P2 may be formed inside the uplift portion 212. Here, the second pocket portion P2 may be referred to as a housing pocket portion.

Also, the lower bearing 720 may be accommodated in the second pocket portion P2. Here, a washer may be disposed below the lower bearing 720.

As shown in FIG. 9, the uplift portion 212 may include a curved surface 212a formed at a certain curvature 1/R. Here, the curved surface 212a may be formed at an inner corner of corners of the uplift portion 212.

When the lower bearing 720 is inserted into the second pocket portion P2, the curved surface 212a may guide insertion of the lower bearing 720. Accordingly, the curved surface 212a may minimize an impact caused by a collision with the lower bearing 720.

The sidewall portion 220 may extend from a top surface of the housing plate portion 210 in the axial direction. Here, the sidewall portion 220 may protrude upward from an edge of the housing plate portion 210.

Meanwhile, second protrusions 221 protruding inward may be formed on the sidewall portion 220. For example, the second protrusions 221 may be formed to protrude inward from an inner circumferential surface 222 of the sidewall portion 220.

Here, the second protrusions 221 may be arranged at preset intervals along a circumferential direction. Accordingly, a top surface 221a of the second protrusion 221 supports an end of the sidewall 120 which forms the cover 100. In detail, the top surface 221a of the second protrusion 221 comes in contact with a bottom surface of the end of the sidewall 120. Accordingly, the top surface 221a of the second protrusion 221 performs a function of a position guide to mount the cover 100 in a preset position.

The second protrusion 221 may be formed by pressurizing one region of the sidewall portion 220 in the radial direction. For example, the second protrusions 221 may be formed on the inner circumferential surface 222 of the sidewall portion 220 due to the applied pressure.

The stator 300 may be supported by an inner circumferential surface of the housing 200. Also, the stator 300 is disposed outside the rotor 400. That is, the rotor 400 may be disposed inside the stator 300.

Referring to FIG. 3, the stator 300 may include a stator core 310, a coil 320 wound on the stator core 310, and an insulator 330 disposed between the stator core 310 and the coil 320. Here, the coil 320 may be a wire of which an outer circumferential surface is coated.

The coil 320, which forms a rotating magnetic field, may be wound on the stator core 310. Here, the stator core 310 may be formed as one core or formed by coupling a plurality of divided cores.

The stator core 310 may include a plurality of plates which have a thin steel sheet shape and are stacked on one another but is not limited thereto. For example, the stator core 310 may be formed as a single item.

The stator core 310 may include a cylindrical yoke (not shown) and a plurality of teeth (not shown).

Here, the teeth may be arranged protruding from the yoke in the radial direction (x direction) on the basis of a center C of the stator core 310. Also, the plurality of teeth may be arranged to be spaced apart along a circumferential direction of the yoke. Accordingly, a slot may be formed between the teeth.

Meanwhile, the teeth may be arranged to face a magnet of the rotor 400. Also, the coil 320 is wound on each of the teeth.

The insulator 330 insulates the stator core 310 from the coil 320. Accordingly, the insulator 330 may be disposed between the stator core 310 and the coil 320.

Accordingly, the coil 320 may be wound on the stator core 310 on which the insulator 330 is disposed.

Meanwhile, when a current is supplied to the coil 320, an electrical interaction with the magnet is caused such that the rotor 400 may rotate. When the rotor 400 rotates, the shaft 500 may also rotate. Here, the shaft 500 may be supported by the bearing 700.

The rotor 400 may be disposed inside the stator 300. Also, the shaft 500 may be coupled with a central part.

The rotor 400 may be formed by coupling a magnet (not shown) to a rotor core (not shown). For example, the rotor 400 may be formed by disposing the magnet on an outer circumferential surface of the rotor core.

Accordingly, the magnet forms a rotating magnetic field with the coil 320 wound on the stator 300. The magnet may be disposed such that N pole and S pole are alternately located in a circumferential direction on the basis of the shaft 500.

Accordingly, the rotor 400 rotates due to an electrical interaction between the coil 320 and the magnet. Also, when the rotor 400 rotates, the shaft 500 rotates such that a driving force of the motor 1 is generated.

Meanwhile, the rotor core of the rotor 400 may be manufactured by coupling a plurality of divided cores or manufactured in a single core form of one cylinder.

The shaft 500 may be rotatably supported by the bearing 700 in the housing 200 as shown in FIG. 3.

The busbar 600 may be disposed above the stator 300. Also, the busbar 600 may be electrically connected to the coil 320 of the stator 300.

The busbar 600 may include a busbar body 610 and a plurality of terminals 620 arranged on the busbar body 610. Here, the busbar body 610 may be a ring-shaped mold material formed through injection molding. Also, one side of each of the terminals 620 may be electrically connected to the coil 320 of the stator 300. Also, the other side of each of the terminals 620, which is exposed externally, may be electrically connected to an external connector (not shown) and supply power.

As shown in FIG. 2, the terminals 620 may pass through the second holes 112. Also, a part of the terminal 620 may be exposed externally.

FIG. 10 is a view illustrating a process of assembling a rotor-cover assembly of the motor according to the first embodiment.

Referring to FIG. 10, in the motor 1, the rotor-cover assembly may be mounted while the stator 300 is disposed inside the housing 200. Here, the rotor-cover assembly may include the cover 100, the shaft 500 disposed at a center of the cover 100, the rotor 400 disposed outside the shaft 500, and the bearing 700 disposed on the outer circumferential surface of the shaft 500. As shown in FIG. 3, the upper bearing 710 may be supported by the cover 100.

Here, a jig 2 may be used as a fixing device which supports the rotor-cover assembly and sets axial concentricity thereof. Here, the jig 2 may include a first leg 3 and a second leg 4.

An end of the first leg 3 is disposed in the groove 122 so as to prevent the rotor-cover assembly from moving horizontally. Here, the second leg 4 may hold an upper side of the shaft 500.

Accordingly, the jig 2 may place the rotor-cover assembly in the housing 200 without impacting an interior of the housing 200.

Embodiment 2

FIG. 11 is a cross-sectional view of a motor according to a second embodiment. Here, FIG. 11 is a cross-sectional view taken along line A-A of FIG. 2.

Hereinafter, in a description of a motor 1a according to the second embodiment, since components equal to those of the motor 1 according to the first embodiment are referred to with the same reference numerals, a detailed description thereof will be omitted.

Referring to FIGS. 11, the motor 1a according to the second embodiment may include the cover 100, a housing 200a disposed below the cover 100, the stator 300 disposed inside the housing 200a, the rotor 400 disposed inside the stator 300, the shaft 500 rotating with the rotor 400, the busbar 600 disposed above the stator 300, the bearing 700 disposed on the outer circumferential surface of the shaft 500, and a cap 800 disposed below the housing 200a.

In comparison to the motor 1 according to the first embodiment, the motor 1a according to the second embodiment may further include a hole formed in a bottom of the housing 200a and the cap 800 configured to cover the hole.

The housing 200a is disposed below the cover 100.

The housing 200a may be formed to have a cylindrical shape. Also, the housing 200a may accommodate the stator 300, the rotor 400, and the like therein.

FIG. 12 is a perspective view illustrating the housing of the motor according to the second embodiment, and FIG. 13 is a cross-sectional view illustrating the housing of the motor according to the second embodiment.

Referring to FIGS. 12 and 13, the housing 200a may include a housing plate portion 210a and a sidewall portion 220 extending upward from the housing plate portion 210a. Also, second protrusions 221 protruding inward may be formed on the sidewall portion 220.

The housing plate portion 210a may include a plate-shaped body 211a with a hole 213 formed in a center thereof and an uplift portion 212 formed by a part protruding from the body 211a.

Here, an inside of the uplift portion 212 may be disposed to be spaced at a certain gap from an outer circumferential surface of the hole 213. Accordingly, the lower bearing 720 may be accommodated in and supported by the second pocket portion P2.

FIG. 14 is a view illustrating a process of assembling a rotor-cover assembly of the motor according to the second embodiment.

Referring to FIG. 14, in the motor 1a, the rotor-cover assembly may be mounted while the stator 300 is disposed inside the housing 200a. Here, the rotor-cover assembly may include the cover 100, the shaft 500 disposed at a center of the cover 100, the rotor 400 disposed outside the shaft 500, and the bearing 700 disposed on the outer circumferential surface of the shaft 500. As shown in FIG. 14, the upper bearing 710 may be supported by the cover 100.

Here, a jig 2a may be used as a fixing device which supports the rotor-cover assembly and sets axial concentricity thereof. Here, the jig 2a may include the first leg 3 and a third leg 5.

An end of the first leg 3 is disposed in the groove 122 so as to prevent the rotor-cover assembly from moving horizontally. Here, the third leg 5 may hold a lower side of the shaft 500. Here, an end of the third leg 5 may pass through the hole 213 and be coupled to a lower side of the shaft 500. For example, a coupling groove may be formed in a bottom end of the shaft 500, and the end of the third leg 5 may be coupled to the coupling groove.

Accordingly, as the jig 2a moves downward, the rotor-cover assembly may be disposed in the housing 200a without impacting an interior of the housing 200a.

When the third leg 5 which passes through the hole 213 and is coupled to a lower side of the shaft 500 is used, it is easier in an aspect of axial concentricity than when the rotor-cover assembly is mounted in the motor 1. Also, since the hole 213 is sealed using the cap 800, it is possible to omit a process of applying a sealing member so as to increase productivity of the motor 1a.

The cap 800 may be disposed to cover the hole 213.

FIG. 15 is a perspective view illustrating the cap of the motor according to the second embodiment.

Referring to FIG. 15, the cap 800 may include a cap body 810 configured to cover the hole 213 and a flange portion 820 protruding outward from an end of the cap body 810.

As shown in FIG. 15, the flange portion 820 may come into contact with a bottom surface of the uplift portion 212 and further improve sealing performance with respect to the hole 213.

Embodiment 3

FIG. 16 is a perspective view illustrating a motor according to a third embodiment, FIG. 17 is a cross-sectional view illustrating the motor according to the third embodiment, and FIG. 18 is an exploded-perspective view illustrating the motor according to the third embodiment. Here, FIG. 17 is a cross-sectional view taken along line A-A of FIG. 16. Here, an x direction shown in FIG. 17 means a radial direction, and a y direction means an axial direction. Also, the axial direction and the radial direction are perpendicular to each other. Here, the axial direction may be a longitudinal direction of the shaft 1500.

Referring to FIGS. 16 to 18, a motor 1b according to the third embodiment may include a cover 1100, a housing 1200 disposed below the cover 1100, a stator 1300 disposed inside the housing 1200, a rotor 1400 disposed inside the stator 1300, a shaft 1500 rotating with the rotor 1400, a busbar 1600 disposed above the stator 1300, and a bearing 1700 disposed on an outer circumferential surface of the shaft 1500. Here, the bearing 1700 may include, depending on positions, an upper bearing 1710 disposed on an upper part of the shaft 1500 and a lower bearing 1720 disposed on a lower part thereof.

Here, in consideration of axial concentricity of the motor 1b, a center C of the motor 1b may be the center C of the cover 1100, the housing 1200, the stator 1300, the rotor 1400, the shaft 1500, and the busbar 1600. Here, on the basis of the center C, an inside means a direction of being disposed toward the center C and an outside means a direction opposite the inside.

The cover 1100 and the housing 1200 may form an exterior of the motor 1b. Here, the housing 1200 may be formed to have a cylindrical shape with an opening on top.

Accordingly, an accommodation space may be formed therein by coupling between the cover 1100 and the housing 1200. Also, in the accommodation space, as shown in FIG. 17, the stator 1300, the rotor 1400, the shaft 1500, and the like may be arranged.

The cover 1100 may be disposed on an opening surface of the housing 1200, that is, above the housing 1200 to cover the opening of the housing 1200.

FIG. 19 is a perspective view illustrating the cover of the motor according to the third embodiment, FIG. 20 is a side view illustrating the cover of the motor according to the third embodiment, FIG. 21 is a plan view illustrating the cover of the motor according to the third embodiment, and FIG. 22 is a cross-sectional view illustrating the cover of the motor according to the third embodiment. Here, FIG. 22 is a cross-sectional view taken along line B-B of FIG. 19.

Referring to FIGS. 19 and 22, the cover 1100 may include a plate-shaped cover plate portion 1110 and a sidewall 1120 extending from the cover plate portion 1110 in the axial direction. Here, the cover plate portion 1110 and the sidewall 1120 may be integrally formed.

The cover plate portion 1110 may be formed to have a plate shape.

In the cover plate portion 1110, a first hole 1111 formed in a center, a plurality of second holes 1112, and at least two first grooves 1113 may be formed. Also, the cover plate portion 1110 may include a first pocket portion P1 formed such that a center is recessed downward. Here, the first pocket portion P1 may be referred to as a cover pocket portion.

The shaft 1500 may be disposed inside the first hole 1111. Here, the upper bearing 1710 may be disposed on the upper part of the shaft 1500 and be disposed in the first pocket portion P1. Accordingly, the cover plate portion 1110 may support the upper bearing 1710.

A terminal of the busbar 1600 may be disposed inside the second hole 1112. Accordingly, while the busbar 1600 is disposed on the stator 1300, when the cover 1100 is coupled to the housing 1200, the terminal of the busbar 1600 passes through and is coupled to the second hole 1112 of the cover plate portion 1110 such that a position of the cover 1100 may be determined. As shown in FIG. 19, three second holes 1112 may be formed in the cover plate portion 1110.

The first grooves 1113 may be formed to be recessed on a top side of the cover plate portion 1110 in the axial direction. Here, the first grooves 1113 may include a first guide groove 1113A and a second guide groove 1113B. Also, the first guide groove 1113A may be disposed on a virtual straight line which connects the second guide groove 1113B to the center C of the cover 1100. For example, a first line L1, which is a virtual line passing through centers of the two first grooves 1113, passes through the center C of the cover 1100. That is, the at least two first grooves 1113 may be collinearly disposed with the first line L1 which is a virtual line passing through the center C of the cover 1100. Also, the first line L1 may be provided as an element for determining a coupling position of the busbar 1600 with respect to the cover 1100.

The sidewall 1120 may protrude downward from a bottom surface of the cover plate portion 1110. For example, the sidewall 1120 may protrude downward from an edge of the cover plate portion 1110. Here, the sidewall 1120 may be formed to have a cylindrical shape. Also, the sidewall 1120 may be formed to have a two-stage shape having different outer diameters at a top and a bottom. Referring to FIGS. 19 and 20, the sidewall 1120 includes an upper region adjacent to the cover plate portion 1110, a lower region located below the upper region, and a stepped region formed between the upper region and the lower region. A plurality of third grooves 1125 may be formed in the upper region.

Referring to FIG. 20, the sidewall 1120 may include a second groove 1122 formed to be recessed at a lower end thereof.

As shown in FIG. 20, the second groove 1122 may be formed at the lower end of the sidewall 1120 to be coupled to second protrusions 1221 of the housing 1200. Accordingly, when the cover 1100 and the housing 1200 are coupled, the second groove 1122 is coupled to the second protrusions 1221 so as to prevent movement in a rotation direction.

Here, the second groove 1122 may be formed to have a certain depth D on the basis of the axial direction, and a size of the motor 1b in the axial direction may be reduced through the depth D.

FIG. 23 is a perspective view illustrating another example of the cover disposed on the motor according to the third embodiment, FIG. 24 is a side view illustrating another example of the cover disposed on the motor according to the third embodiment, FIG. 25 is a bottom view illustrating another example of the cover disposed on the motor according to the third embodiment, and FIG. 26 is a cross-sectional view illustrating another example of the cover disposed on the motor according to the third embodiment. Here, FIG. 26 is a cross-sectional view taken along line C-C of FIG. 23.

Referring to FIGS. 23 to 26, a cover 1100a according to another example may include the plate-shaped cover plate portion 1110 and a sidewall 1120a extending from the cover plate portion 1110 in the axial direction. Here, the cover 1100a has a difference from the cover 1100 according to one embodiment in an aspect that the third grooves 1125 are formed in the sidewall 1120a. Also, the cover 1100a according to another embodiment may be disposed on the motor 1b instead of the cover 1100 according to one embodiment.

To allow a fixing device such as a jig to hold the cover 1100a, the third grooves 1125 may be formed in the sidewall 1120a. Accordingly, an end of the jig may be disposed in the third grooves 1125 such that the jig may pressurize the cover 1100a. Also, the jig moves the cover 1100a toward the housing 1200 to couple the cover 1100a to the housing 1200.

At least three third grooves 1125 may be concavely formed in an outer circumferential surface 1121 of the sidewall 120. To prevent horizontal movement of the cover 1100a, at least three third grooves 1125 may be arranged at preset intervals. Accordingly, an angle formed between virtual lines which connect the third grooves 1125 to a center of the cover 1100a is 120 degrees.

Here, the three third grooves 1125 are shown as an example but the present invention is not limited thereto.

Referring to FIG. 25, four third grooves 1125 may be arranged. Here, the third grooves 1125 may be arranged to be rotationally symmetrical on the basis of the center C of the cover 1100a.

That is, since the third grooves 1125 are arranged on the same level, they may be arranged to be rotationally symmetrical on the basis of the center C of the cover 100. Accordingly, the fixing device prevents horizontal movement of the cover 1100a by applying a certain level of force to the outer circumferential surface 1121 of the cover 1100a through the third groove 1125.

Referring to FIG. 26, the third grooves 1125 may be arranged to be spaced at a certain first distance d1 from an end of the sidewall 1120a. Also, the third grooves 1125 may be arranged to be spaced at a certain second distance d2 from a corner at which the cover plate portion 1110 and the sidewall 1120a meet each other, for example, a bottom surface of the cover plate portion 1110.

Here, the first distance d1 is greater than the second distance d2. Accordingly, the cover 1100a may secure stiffness corresponding to a force applied to the third grooves 1125. For example, most of the force applied to the cover 1100a in a horizontal direction by the fixing device is supported by the cover plate portion 1110.

The third grooves 1125 may be formed by a pressing process and the like of pressurizing one region of the sidewall 1120*a* in the radial direction. Here, first protrusions 1124 may be formed on an inner circumferential surface 1123 of the sidewall 1120*a* to protrude inward from the inner circumferential surface 1123 of the sidewall 1120*a* due to the applied pressure. That is, the third grooves 1125 and the first protrusions 1124 may be formed on the cover 1100 at the same time by the applied pressure.

As shown in FIG. 26, an inner surface 1124*a* of the first protrusion 1124 may be formed to tilt at a certain angle θ on the basis of the axial direction by the applied pressure. Here, the inner surface 1124*a* of the first protrusion 1124 may be formed to tilt upward. Accordingly, a tilted surface 1125*a* of the third groove 1125 may also be formed to tilt upward.

Accordingly, a load applied to the third grooves 1125 by the fixing device may be guided toward the cover plate portion 1110 by a difference between the first distance d1 and the second distance d2 and be further guided toward the cover plate portion 1110 by the tilted surfaces 1125*a* of the third grooves 1125.

Here, the cover 1100*a* includes the third grooves 1125 as an example but is not limited thereto. For example, like the cover 1100 according to one embodiment, in consideration of a manufacturing process and interruption of the third grooves 1125 caused by a shape of the busbar 1600 disposed inside the cover 1100, the third grooves 1125 may be eliminated from the cover 1100*a*.

The housing 1200 is disposed below the cover 1100.

Here, the housing 1200 may be formed to have a cylindrical shape. Also, the housing 1200 may accommodate the stator 1300, the rotor 1400, and the like therein. Here, a shape or a material of the housing 1200 may be variously modified. For example, the housing 1200 may be formed of a metal material capable of withstanding high temperatures well.

FIG. 27 is a perspective view illustrating the housing of the motor according to the third embodiment, and FIG. 28 is a cross-sectional view illustrating the housing of the motor according to the third embodiment.

Referring to FIGS. 27 and 28, the housing 1200 may include a housing plate portion 1210 and a sidewall portion 1220 extending upward from the housing plate portion 1210.

The housing plate portion 1210 may include a plate-shaped body 1211 and an uplift portion 1212 formed by a part protruding from the body 1211.

When viewed from above, the uplift portion 1212 may have a ring shape. Here, the uplift portion 1212 may be formed by pressurizing a bottom of the body 1211. As shown in FIG. 24, the housing plate portion 1210 may be formed to have an uneven shape due to the uplift portion 1212.

Since the uplift portion 1212 is disposed to be spaced from a center C of the body 1211 in the radial direction, a second pocket portion P2 may be formed inside the uplift portion 1212. Here, the second pocket portion P2 may be referred to as a housing pocket portion.

Also, the lower bearing 1720 may be accommodated in the second pocket portion P2. Here, a washer may be disposed below the lower bearing 1720.

As shown in FIG. 28, the uplift portion 1212 may include a curved surface 1212*a* formed at a certain curvature 1/R. Here, the curved surface 1212*a* may be formed at an inner corner of corners of the uplift portion 1212.

When the lower bearing 1720 is inserted into the second pocket portion P2, the curved surface 1212*a* may guide insertion of the lower bearing 1720. Accordingly, the curved surface 1212*a* may minimize an impact caused by a collision with the lower bearing 1720.

The sidewall portion 1220 may extend from a top surface of the housing plate portion 1210 in the axial direction. Here, the sidewall portion 1220 may protrude upward from an edge of the housing plate portion 1210.

Meanwhile, second protrusions 1221 protruding inward from an inner surface of the sidewall portion 1220 may be formed on the sidewall portion 1220. Accordingly, the housing 1200 may include the second protrusions 1221 protruding inward. For example, the second protrusions 1221 may be formed to protrude inward from an inner circumferential surface 1222 of the sidewall portion 1220.

Here, the second protrusions 1221 may be arranged at preset intervals along a circumferential direction. Accordingly, the second protrusions 1221 are coupled to the second groove 1122 of the sidewall 1120 which forms the cover 1100. Accordingly, a top surface 1221*a* of the second protrusion 1221 performs a function of a position guide to mount the cover 1100 in a preset position.

The second protrusion 1221 may be formed by pressurizing one region of the sidewall portion 1220 in the radial direction. For example, the second protrusions 1221 may be formed on the inner circumferential surface 1222 of the sidewall portion 1221 to protrude therefrom due to the applied pressure.

The stator 1300 may be supported by an inner circumferential surface of the housing 1200. Also, the stator 1300 is disposed outside the rotor 1400. That is, the rotor 1400 may be disposed inside the stator 1300.

Referring to FIG. 17, the stator 1300 may include a stator core 1310, a coil 1320 wound on the stator core 1310, and an insulator 1330 disposed between the stator core 1310 and the coil 1320. Here, the coil 1320 may be a wire of which an outer circumferential surface is coated.

The coil 1320, which forms a rotating magnetic field, may be wound on the stator core 1310. Here, the stator core 1310 may be formed as one core or formed by coupling a plurality of divided cores.

The stator core 1310 may include a plurality of plates which have a thin steel sheet shape and are stacked on one another but is not limited thereto. For example, the stator core 1310 may be formed as a single item.

The stator core 1310 may include a cylindrical yoke (not shown) and a plurality of teeth (not shown).

Here, the teeth may be arranged protruding from the yoke in the radial direction (x direction) on the basis of a center C of the stator core 1310. Also, the plurality of teeth may be arranged to be spaced apart along a circumferential direction of the yoke. Accordingly, a slot may be formed between the teeth.

Meanwhile, the teeth may be arranged to face a magnet of the rotor 1400. Also, the coil 1320 is wound on each of the teeth.

The insulator 1330 insulates the stator core 1310 from the coil 1320. Accordingly, the insulator 1330 may be disposed between the stator core 1310 and the coil 1320.

Accordingly, the coil 1320 may be wound on the stator core 1310 on which the insulator 1330 is disposed.

Meanwhile, when a current is supplied to the coil 1320, an electrical interaction with the magnet is caused such that the rotor 1400 may rotate. When the rotor 1400 rotates, the shaft 1500 may also rotate. Here, the shaft 1500 may be supported by the bearing 1700.

The rotor 1400 may be disposed inside the stator 1300. Also, the shaft 1500 may be coupled with a central part.

The rotor 1400 may be formed by coupling a magnet (not shown) to a rotor core (not shown). For example, the rotor 1400 may be formed by disposing the magnet on an outer circumferential surface of the rotor core.

Accordingly, the magnet forms a rotating magnetic field with the coil 1320 wound on the stator 1300. The magnet may be disposed such that N pole and S pole are alternately located in a circumferential direction on the basis of the shaft 1500.

Accordingly, the rotor 1400 rotates due to an electrical interaction between the coil 1320 and the magnet. Also, when the rotor 1400 rotates, the shaft 1500 rotates such that a driving force of the motor 1b is generated.

Meanwhile, the rotor core of the rotor 1400 may be manufactured by coupling a plurality of divided cores or manufactured as a single core form of one cylinder.

The shaft 1500 may be rotatably supported by the bearing 700 in the cover 1100 and the housing 1200 as shown in FIG. 17.

The busbar 1600 may be disposed above the stator 1300.

Also, the busbar 1600 may be electrically connected to the coil 1320 of the stator 1300.

FIG. 29 is a perspective view illustrating the busbar of the motor according to the third embodiment, and FIG. 30 is a plan view illustrating the busbar of the motor according to the third embodiment.

Referring to FIGS. 29 and 30, the busbar 1600 may include a busbar body 1610 and a plurality of terminals 1620 arranged on the busbar body 1610. Here, the terminals 1620 may be arranged on the busbar body 1610 through insert-injection molding.

The busbar body 1610 may be a ring-shaped mold material formed through injection molding.

As shown in FIGS. 29 and 30, the busbar body 1610 may include at least two fourth grooves 1611 concavely formed on a top surface. Here, the fourth grooves 1611 formed in the busbar body 1610 may be referred to as grooves of the busbar body 1610 or busbar-body grooves.

The two fourth grooves 1611 may be collinearly disposed with a second line L2 which is a virtual line passing through a center C of the busbar 1600. For example, the second line L2, which is a virtual line passing through centers of the two fourth grooves 1611, passes through the center C of the busbar 1600.

Here, the second line L2 may be provided as an element which determines a coupling position of the cover 1100 with respect to the busbar 1600 through a disposition relationship with the above first line L1.

Referring to FIG. 18, the first line L1 and the second L2 may be arranged to be parallel to each other.

For example, while the stator 1300 and the busbar 1600 are arranged inside the housing 1200, the first line L1 determines a position of the housing 1200 to be coupled with the cover 1100. That is, when the cover 1100 and the housing 1200 are coupled to each other, the first grooves 1113 of the cover plate portion 1110 and the fourth grooves 1611 of the busbar 1600 may be used to align positions of the cover plate portion 1110 and the busbar 1600 and to restrict movement of the busbar 1600.

Here, an assembly in which the stator 1300 and the busbar 1600 are assembled in the housing 1200 in which the lower bearing 1720 is disposed may be referred to as a housing assembly. Hence, an assembling position of the housing assembly may be determined on the basis of the first line L1.

Also, a rotor-cover assembly may be installed in the housing assembly. Here, while the first line L1 and the second line L2 remain in a state of being parallel to each other, the rotor-cover assembly may be coupled to the housing assembly. Here, the rotor-cover assembly may include the cover 1100, the shaft 1500 disposed at a center of the cover 1100, the rotor 1400 disposed outside the shaft 1500, and the upper bearing 1710 disposed on the outer circumferential surface of the shaft 1500.

Accordingly, in the motor 1b, a position of assembling the cover 1100 with the housing 1200 may be determined by coupling the rotor-cover assembly to the housing assembly while the housing assembly is disposed on the basis of the first line L1 and while the second line L2 remains in a state of being parallel to the first line L1.

Here, a fixing device such as a jig may be used to couple the housing assembly to the rotor-cover assembly. Also, the motor 1b may include a sensor (not shown) to sense and adjust whether the first line L1 and the second line L2 are parallel to each other. Here, since the first line L1 and the second line L2 are virtual lines, the sensor may sense the first grooves 1113 and the fourth grooves 1611 to maintain the first line L1 and the second line L2 in a state of being parallel to each other.

The motor 1b may maintain in a state of the first line L1 and the second line L2 being parallel to each other using the sensor as an example but is not limited thereto. For example, without an additional sensor, positions for holding the housing assembly and the rotor-cover assembly may be determined using a position of the fixing device and the position of the fixing device may be adjusted as a preset position, thereby maintaining the first line L1 and the second line L2 to be parallel to each other.

Referring to FIG. 17, the first grooves 1113 may be arranged further inward in the radial direction than the fourth grooves 1611. As shown in FIG. 17, a virtual third line L3, which passes through a center of the first groove 1113 in the axial direction, may be disposed further inward than a virtual fourth line L4 which passes through a center of the fourth groove 1611 in the axial direction. Here, the third line L3 and the fourth line L4 may be disposed to be parallel to a virtual line which passes through the center C in the axial direction.

Accordingly, in the motor 1b, it is possible to determine whether a position at which the cover 1100 is coupled to the housing 1200 is adequate or inadequate using arrangement positions of the first grooves 1113 and the fourth grooves 1611 arranged to be spaced outward from the first grooves 1113 using a sensor device (not shown) capable of sensing positions of the first grooves 1113 and the fourth grooves 1611 in the axial direction. Here, the first grooves 1113 and the fourth grooves 1611 may be arranged to be overlapped with one another in the axial direction (a vertical direction). However, in consideration of a mistaken recognition of the sensor device, only some of the first grooves 1113 and the fourth grooves 1611 may be overlapped or arranged to be spaced apart.

Meanwhile, one side of each of the terminals 1620 may be electrically connected to the coil 1320 of the stator 1300. Also, the other side of each of the terminals 1620, which is exposed externally, may be electrically connected to an external connector (not shown) and supply power to the coil 1320.

As shown in FIG. 16, the terminals 1620 may pass through the second holes 1112. Accordingly, a part of the terminal 1620 may be exposed outward on the basis of the cover 1100.

FIG. 31 is a view illustrating a process of assembling the rotor-cover assembly of the motor according to the third embodiment. Here, the cover disposed in the rotor-cover assembly may include the third grooves 1125.

Referring to FIG. 31, in the motor 1*b*, the rotor-cover assembly may be mounted while the stator 1300 is disposed inside the housing 1200. Here, the rotor-cover assembly may include the cover 1100*a*, the shaft 1500 disposed at a center of the cover 1100*a*, the rotor 1400 disposed outside the shaft 1500, and the upper bearing 1710 disposed on the outer circumferential surface of the shaft 1500.

Here, the jig 2 may be used as a fixing device which supports the rotor-cover assembly and sets axial concentricity thereof. Here, the jig 2 may include a first leg 3 and a second leg 4.

An end of the first leg 3 is disposed in the third groove 1125 so as to prevent the rotor-cover assembly from moving horizontally. Here, the second leg 4 may hold an upper side of the shaft 1500. Accordingly, the jig 2 may place the rotor-cover assembly inside the housing 1200 without impacting an interior of the housing 1200.

In addition, the jig 2 may include the third leg 5 with ends disposed in the first grooves 1113. Accordingly, the third leg 5 may be coupled to the first grooves 1113 so as to allow the cover 1100 or 1100*a* to maintain a position level of the first line L1 being parallel to the second line L2.

Although the exemplary embodiments of the present invention have been described above, it may be understood by one of ordinary skill in the art that a variety of modifications and changes may be made without departing from the concept and scope of the present invention disclosed within the range of the following claims. Also, it should be noted that differences related to the modifications and changes are included within the scope of the present invention defined by the claims.

DESCRIPTION OF REFERENCE NUMERALS

1, 1*a*, 1*b*: motor, 100, 1100, 1100*a*: cover, 110, 1110: cover plate portion, 120, 1120: sidewall, 200, 200*a*, 1200: housing, 210, 1210: housing plate portion, 220, 1220: sidewall portion, 300, 1300: stator, 400, 1400: rotor, 500, 1500: shaft, 600, 1600: busbar, 700, 1700: bearing, 800: cap, P1: first pocket portion, P2: second pocket portion

The invention claimed is:

1. A motor comprising:
a shaft;
a rotor coupled to the shaft;
a stator disposed outside the rotor;
a busbar disposed above the stator;
a housing in which the rotor and the stator are disposed and which comprises an opening; and
a cover coupled to the housing,
wherein the cover comprises a cover plate portion, in which a hole is formed, and a sidewall extending downward from the cover plate portion, and
wherein the housing comprises:
a housing plate portion;
a sidewall portion extending upward from the housing plate portion; and
a plurality of housing protrusions formed to protrude inward from an inner surface of the sidewall portion,
wherein a top surface of each of the housing protrusions contacts a bottom surface of the sidewall portion.

2. The motor of claim 1, wherein the sidewall comprises a plurality of protrusions and a plurality of grooves, and
wherein the plurality of grooves of the sidewall are formed in one region of an outer circumferential surface of the sidewall to be recessed inward, and the protrusions of the sidewall are formed on an inner circumferential surface of the sidewall by applied pressure.

3. The motor of claim 1, wherein the top surface of the housing protrusions is arranged to overlap with a portion of an area of the bottom surface of the sidewall in the axial direction.

4. The motor of claim 1, wherein at least three the housing protrusions are disposed along a circumferential direction at preset intervals.

5. The motor of claim 4, wherein the top surfaces of at least three of the housing protrusions are disposed at the same height.

6. The motor of claim 1, wherein a total area of the top surface of the housing protrusions does not completely overlap with a total area of the bottom surface of the sidewall.

7. The motor of claim 1, wherein the housing protrusions are formed to be inclined at a predetermined angle.

8. The motor of claim 1, wherein the housing protrusions guide a circumferential position or an axial position of the sidewall.

9. A motor comprising:
a shaft;
a rotor coupled to the shaft;
a stator disposed outside the rotor;
a busbar disposed above the stator;
a housing in which the rotor and the stator are disposed and which comprises an opening; and
a cover coupled to the housing,
wherein the cover comprises a cover plate portion comprising a plurality of grooves and a sidewall extending downward from the cover plate portion,
wherein the busbar comprises grooves overlapped with the grooves of the cover plate portion in an axial direction of the shaft, and
wherein the grooves of the busbar are spaced apart from the grooves of the cover plate portion.

10. The motor of claim 9, wherein when the cover and the housing are coupled to each other, the grooves of the cover plate portion and the grooves of the busbar are used to align positions of the cover plate portion and the busbar and to restrict movement of the busbar.

11. A motor comprising:
a housing which comprises an opening;
a cover coupled to the housing;
a rotor disposed in the housing;
a stator disposed between the rotor and the housing; and
a busbar disposed between the stator and the cover,
wherein the cover comprises a cover plate portion comprising at least one groove,
wherein the busbar comprises at least one groove, and
wherein a first virtual line on which a center of the cover and the groove of the cover plate portion are disposed and a second virtual line on which a center of the busbar and the groove of the busbar are disposed are parallel to each other.

12. The motor of claim 11, wherein the cover comprises a sidewall extending downward from the cover plate portion, and
wherein the housing comprises:
a housing plate portion;
a sidewall portion extending upward from the housing plate portion; and a plurality of housing protrusions formed to protrude inward from the inner surface of the sidewall portion, wherein a top surface of the each of the housing protrusions contacts a bottom surface of the sidewall portion.

* * * * *